United States Patent
Merrell

(10) Patent No.: US 12,437,478 B2
(45) Date of Patent: Oct. 7, 2025

(54) AUTOMATICALLY GENERATING GRAPH GRAMMARS FROM SHAPES

(71) Applicant: Paul Merrell, Redwood City, CA (US)

(72) Inventor: Paul Merrell, Redwood City, CA (US)

(*) Notice: Subject to any disclaimer, the term of this patent is extended or adjusted under 35 U.S.C. 154(b) by 314 days.

(21) Appl. No.: 18/295,964

(22) Filed: Apr. 5, 2023

(65) Prior Publication Data
US 2023/0316650 A1    Oct. 5, 2023

Related U.S. Application Data

(60) Provisional application No. 63/327,713, filed on Apr. 5, 2022.

(51) Int. Cl.
*G06T 17/20*    (2006.01)
*G06T 7/50*    (2017.01)

(52) U.S. Cl.
CPC .............. *G06T 17/20* (2013.01); *G06T 7/50* (2017.01)

(58) Field of Classification Search
None
See application file for complete search history.

(56) References Cited

U.S. PATENT DOCUMENTS

| | | | | |
|---|---|---|---|---|
| 2002/0004710 A1* | 1/2002 | Murao | .................... | G06F 16/29 702/167 |
| 2003/0152273 A1* | 8/2003 | McCormack | ........ | G06V 10/424 382/203 |
| 2005/0038642 A1* | 2/2005 | Rameau | .................. | G06F 30/00 704/1 |
| 2011/0181589 A1* | 7/2011 | Quan | ...................... | G06T 17/05 345/420 |
| 2012/0173212 A1* | 7/2012 | Rameau | .................. | G06F 30/00 703/2 |
| 2016/0173124 A1* | 6/2016 | Majumdar | ............... | H03V 7/14 708/203 |
| 2019/0051043 A1* | 2/2019 | Hopper | .................. | G06T 17/20 |

OTHER PUBLICATIONS

Strobbe, Tiemen, Ronald De Meyer, and Jan Van Campenhout. "A semi-automatic approach for the definition of shape grammar rules." Journal of Materials Processing Technology 136.s1-3 (2015): 174-178.*

(Continued)

*Primary Examiner* — Sultana M Zalalee
(74) *Attorney, Agent, or Firm* — Kirton McConkie; Brian Tucker

(57) ABSTRACT

Polygonal shapes can be generated automatically from an example using a graph grammar. The graph grammars can then be used to generate graphs that are locally similar to a given example. An input shape can be disassembled into small pieces called primitives and then the primitives can be reassembled into new graphs. All possible locally similar graphs can be organized into a graph hierarchy and then matching graphs can be found within the graph hierarchy. These matches are used to create a graph grammar that can construct every locally similar graph. The graphs can be generated using the graph grammar and then converted into a planar graph drawing to produce the final shape.

20 Claims, 17 Drawing Sheets

(56) References Cited

OTHER PUBLICATIONS

Demir, Ilke, and Daniel G. Aliaga. "Guided proceduralization: Optimizing geometry processing and grammar extraction for architectural models." Computers & Graphics 74 (2018): 257-267.*
Liu, Han, et al., Replaceable Substructures for Efficient Part-Based Modeling, HAL Open Science, Computer Graphics Forum, 34 (2), pp. 503-513, Sep. 29, 2015, <10.1111/cgf. 12579>, <hal-01134783v2>.
Bokeloh, Martin, et al., A Connection Between Partial Symmetry and Inverse Procedural Modeling, ACM Transactions on Graphics, vol. 29, Issue 4, Article No. 104, pp. 1-10, Jul. 26, 2010, Association for Computing Machinery, New York, NY.

* cited by examiner

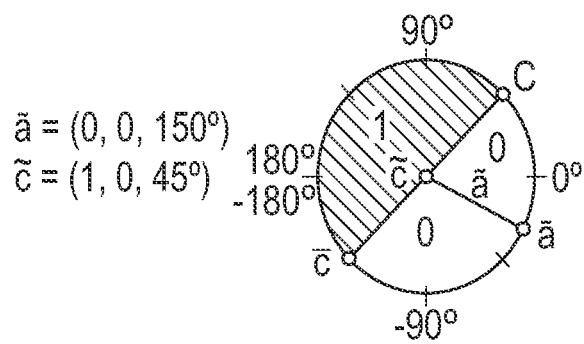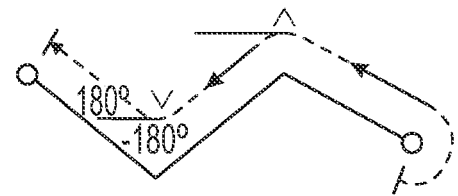
FIG. 3A  FIG. 3B
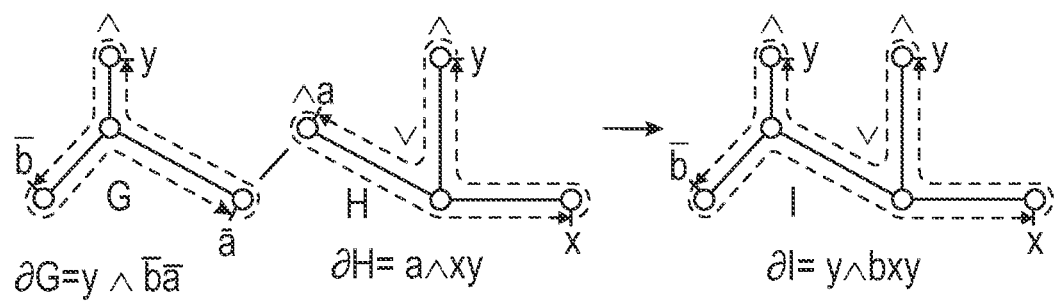
FIG. 3C
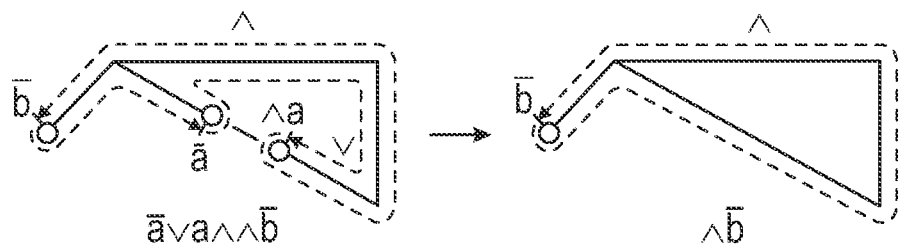
FIG. 3D

Constructive, Complex ← → Destructive, Reduced, Simplified

AUTOMATICALLY GENERATING GRAPH GRAMMARS FROM SHAPES

CROSS-REFERENCE TO RELATED APPLICATIONS

This application claims the benefit of U.S. Provisional Patent Appl. No. 63/327,713.

BACKGROUND

Large detailed geometric shapes are needed in many different games, animated movies, virtual worlds, and other applications. Creating these complex shapes is a challenging labor-intensive task and remains one of the most important challenges in computer graphics.

Such shapes can be generated automatically using various grammars. Although grammars are very effective in generating complex variations, the grammar itself can be difficult to create. A grammar is made of production rules which can be employed during the process of creating a shape (e.g., by describing how a nonterminal node of a graph or part of the graph can be replaced). It is often unclear what production rules are needed to produce a given set of shapes. Therefore, defining production rules of a particular grammar is a difficult process that often requires some trial and error. The definition of production rules is technically challenging and resembles computer programming more than artistic design.

Procedural modeling, in general terms, is the process of generating assets using procedures rather than manual modeling. In the context of this specification, procedural modeling includes generating shapes using a grammar. A common approach to procedural modeling is to use a shape grammar. In their original formulation, shape grammars were complicated and were often manually applied with a human deciding which rules to use. Another approach is to use an L-system which is a string replacement grammar in which a string is turned into a model by interpreting it with a Logo-style turtle. The rules of a shape grammar, L-system and similar systems are usually hand crafted by experts.

A few methods do generate rules automatically from an example. This is known as inverse procedural modeling. Some techniques learn a split shape grammar to model building facades. Other techniques learn a grammar from 3D models with scene graphs or web pages. Further techniques learn L-systems from trees or vector art. These existing techniques for automatically generating rules are only targeted to particular types of models such as tree-like structures which are relatively easy to handle.

Some existing techniques automatically generate a shape grammar from an input shape. (See Martin Bokeloh, Michael Wand, and Hans-Peter Seidel. 2010. A Connection between Partial Symmetry and Inverse Procedural Modeling. *ACM Trans. Graph.* 29, 4 (2010); Han Liu, Ulysse Vimont, Michael Wand, Marie-Paule Cani, Stefanie Hahmann, Damien Rohmer, and Niloy Mitra. 2015. Replaceable Substructures for Efficient Part-Based Modeling. *Computer Graphics Forum* 34 (05 2015)). These existing techniques search for partial symmetries and use them to create a grammar that produces locally similar shapes. These methods work well for some, but not all, input shapes. They have trouble with cycles and cannot generate every locally similar shape for even simple shapes like rectangles.

Graph grammars, which are distinct from shape grammars, are used in many applications ranging from compiler design, pattern recognition, concurrent systems, database design, mesh subdivision, and robot design. However, graph grammars are only rarely used for procedural modeling. Even when graph grammars are used for procedural modeling, the production rules are hand crafted.

BRIEF SUMMARY

Polygonal shapes can be generated automatically from an example using a graph grammar. The graph grammars can then be used to generate graphs that are locally similar to a given example. An input shape can be disassembled into small pieces called primitives and then the primitives can be reassembled into new graphs. All possible locally similar graphs can be organized into a graph hierarchy and then matching graphs can be found within the graph hierarchy. These matches are used to create a graph grammar that can construct every locally similar graph. The graphs can be generated using the graph grammar and then converted into a planar graph drawing to produce the final shape.

In some embodiments, the present invention may be implemented as a method for deriving a graph grammar consisting of production rules. An example shape can be identified. The example shape can be split into primitives where each primitive encompasses a vertex of the example shape. A graph hierarchy of graphs can be created using the primitives. For each of one or more graphs in the graph hierarchy, a matching set of graphs in the graph hierarchy can be found. For each matching set of graphs in the graph hierarchy, a production rule of the graph grammar can be defined based on the matching set such that the graph grammar includes a plurality of production rules.

In some embodiments, a top level of the graph hierarchy includes edges.

In some embodiments, the graph hierarchy includes the primitives.

In some embodiments, creating the graph hierarchy of graphs using the primitives comprises attaching primitives together to form larger graphs.

In some embodiments, creating the graph hierarchy of graphs using the primitives comprises attaching primitives to graphs.

In some embodiments, a matching set of graphs have the same boundary strings.

In some embodiments, a matching set of graphs have the same half-edges.

In some embodiments, a matching set of graphs have the same turns.

In some embodiments, a matching set of graphs have half-edges that are partitioned and the partition does not cross.

In some embodiments, finding a matching set of graphs in the graph hierarchy for a first graph comprises identifying each way in which other graphs in the graph hierarchy can be matched to half-edges of the first graph.

In some embodiments, finding the matching set of graphs in the graph hierarchy for the first graph comprises, for each way in which other graphs in the graph hierarchy can be matched to half-edges of the first graph, grouping any unmatched half-edges of the first graph into groups of consecutive half-edges.

In some embodiments, finding the matching set of graphs in the graph hierarchy for the first graph comprises, for each grouping, finding a matching set of graphs in the graph hierarchy for the unmatched half-edges represented by the grouping.

In some embodiments, finding a matching set of graphs in the graph hierarchy comprises matching faces and edges of a 3D mesh.

In some embodiments, the method can also include constructing shapes using the graph grammar.

In some embodiments, constructing shapes using the graph grammar comprises generating angle graphs without vertex positions.

In some embodiments, the present invention may be implemented as computer storage media storing computer executable instructions which when executed implement a method for deriving a graph grammar consisting of production rules. An example shape can be identified. The example shape can be split into primitives where each primitive encompasses a vertex of the example shape. A graph hierarchy of graphs can be created using the primitives. For each of one or more graphs in the graph hierarchy, a matching set of graphs in the graph hierarchy can be found. For each matching set of graphs in the graph hierarchy, a production rule of the graph grammar can be defined based on the matching set such that the graph grammar includes a plurality of production rules.

In some embodiments, the example shape is two-dimensional, and a matching set of graphs have the same boundary strings.

In some embodiments, the example shape is three-dimensional, and a matching set of graphs have the same boundary surface.

In some embodiments, a particular graph in the graph hierarchy can be reduced using descendants of the particular graph.

In some embodiments, a particular graph in the graph hierarchy can be reduced using a stub.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 1A and 1B each show two shapes that are r-similar;

FIG. 3A provides an example of a graph with face and edge labels;

FIG. 3B provides an example of a graph with positive and negative turns for paths;

FIG. 3C provides examples of how graphs can be branch glued;

FIG. 3D provides examples of how graphs can be loop glued;

DETAILED DESCRIPTION

Figure 1A:
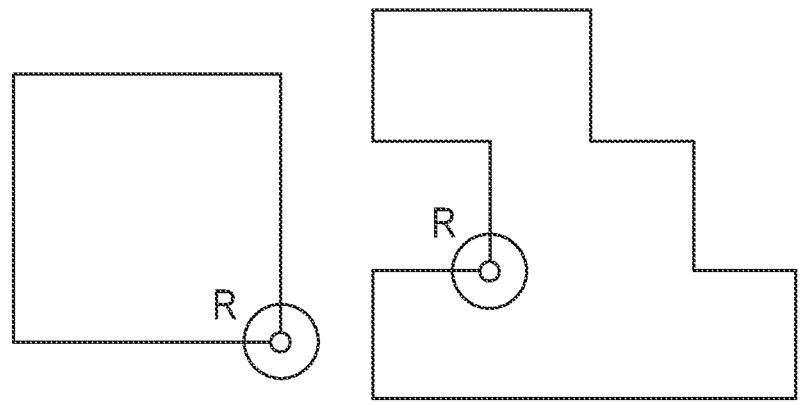
Figure 1B:
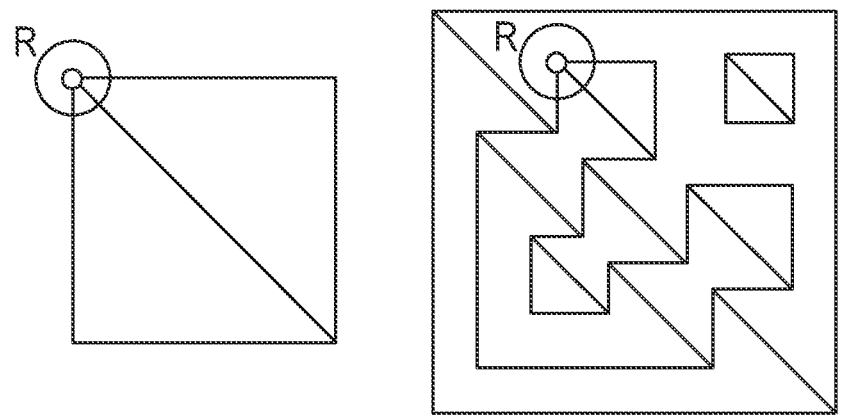

Embodiments of the present invention facilitate generating an output shape that resembles an input shape where the input and output shapes are locally similar. An input shape and output shape are locally similar when every small region within the output shape matches a small region in the input shape. In some embodiments, local similarity can be characterized as r-similarity where each matching region is a circular neighborhood of radius r. For example, FIGS. 1A and 1B each include two shapes that are r-similar. In some embodiments, the radius r can be infinitesimally small such that the circular neighborhood includes only an edge, vertex, or face.

Overview

Figure 2A:
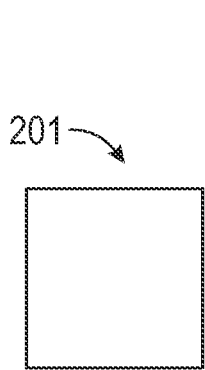
FIGS. 2A-2G provide an example of how embodiments of the present invention can be implemented to facilitate generating locally similar shapes.
Figure 2B:
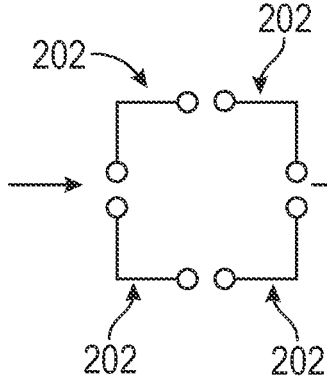
Figure 2C:
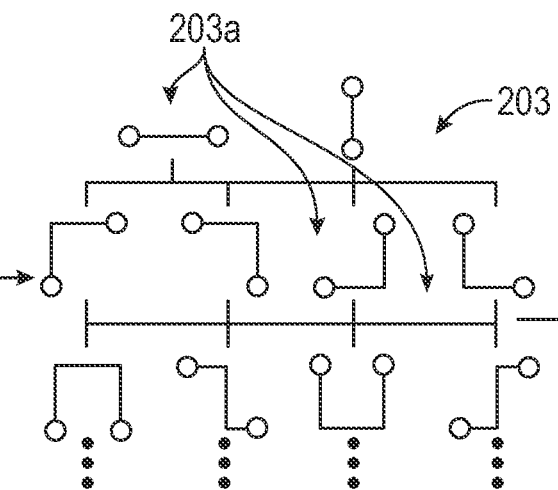
Figures 2D, 2E:
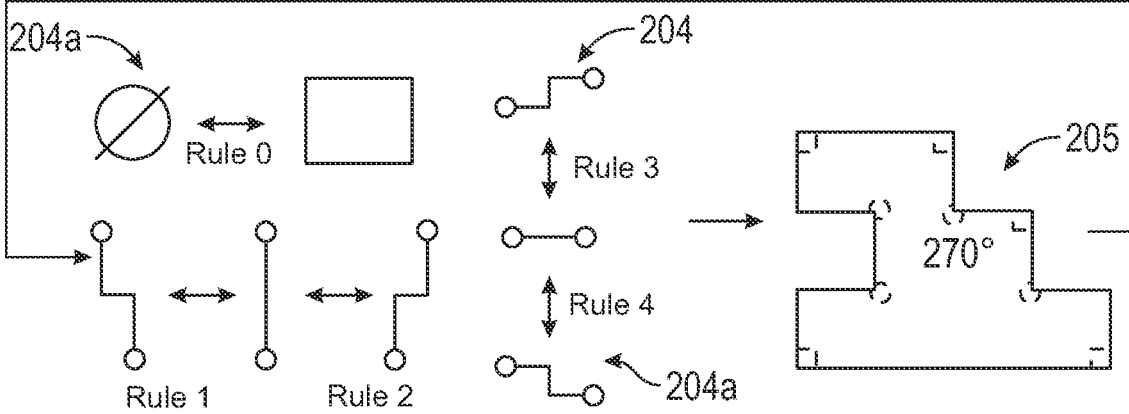
Figures 2F, 2G:
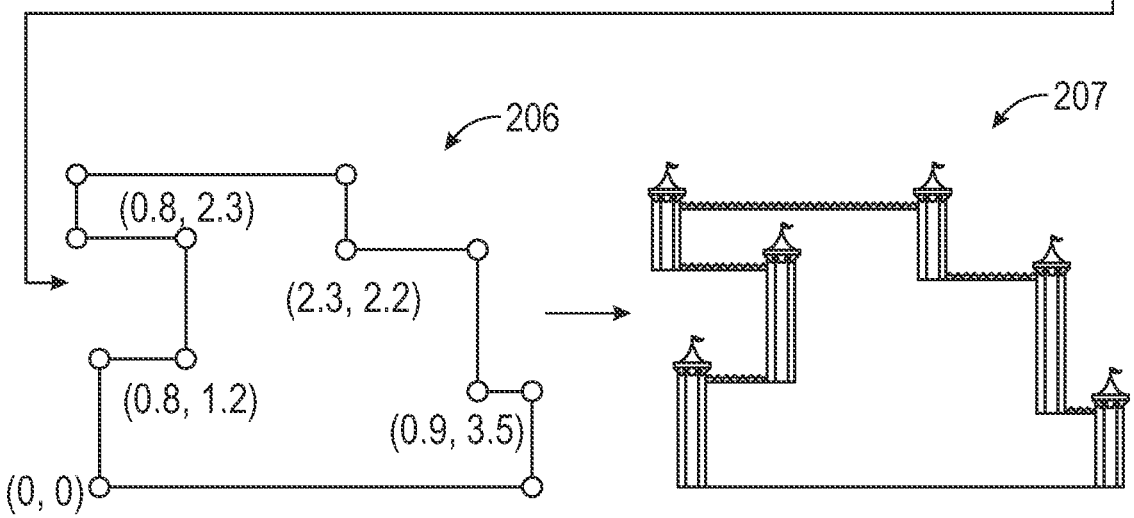

FIGS. 2A-2G provide an example of how embodiments of the present invention can be implemented to facilitate generating locally similar shapes. The process of generating locally similar shapes can be divided into three stages: (1) finding a set of locally similar graphs and organizing them into a graph hierarchy (FIGS. 2A-2C); (2) constructing a graph grammar from the graph hierarchy (FIG. 2D); and using the graph grammar to generate locally similar shapes (FIGS. 2E-2G).

FIG. 2A shows an example polygonal input shape, which in this case is a square, that is represented by a graph 201. FIG. 2B represents the disassembly of graph 201 into small pieces called primitives 202. FIG. 2C represents how primitives 202 can be reassembled into new graphs 203a which are organized into a graph hierarchy 203.

Figure 6:
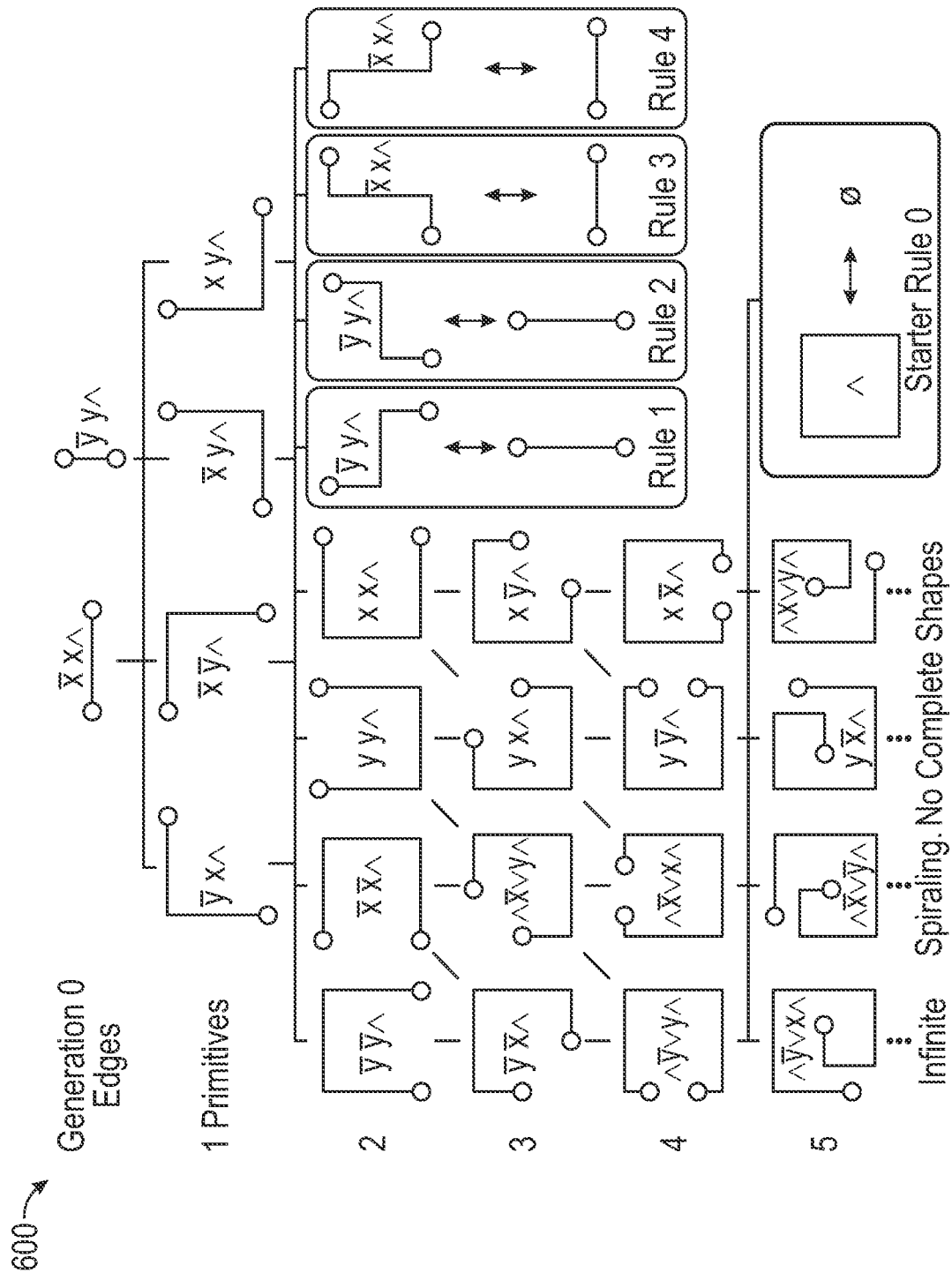
FIG. 6 provides an example of a graph hierarchy that may be generated in accordance with embodiments of the present invention.

FIG. 2D shows how graph hierarchy 203 can be used to construct a graph grammar 204 (see FIG. 6 for more details). As described in greater detail below, in accordance with embodiments of the present invention, graph hierarchy 203 can be incrementally constructed and then matches can be found within graph hierarchy 203. When a match is found, a production rule 204a of graph grammar 204 can be automatically generated based on the match and graph hierarchy 203 can be updated to remove parts of graph hierarchy 203. This process of automatically generating production rules 204a can be repeated until graph grammar 204 includes sufficient production rules 204a to produce every locally similar graph.

FIGS. 2E-2G represent how graph grammar 204 can be used to generate graphs and then output shapes. FIG. 2E represents how graph grammar 204 can be used to generate labeled graphs 205 with straight edges at known angles (or "angle graphs"). An angle graph 205 does not include vertex positions or edge lengths. This information can be filled in using rejection sampling and can produce an angle graph with vertex positions (or "graph drawing 206") as represented in FIG. 2F. Finally, decorations can be added as a post-processing option to yield the final output shape 207 as represented in FIG. 2G.

Notation and Representation

In the context of this specification, input and output shapes consist of vertices, edges, and faces. The following notations and representations are used in this specification and may be helpful in understanding embodiments of the present invention.

Face Labels. Faces are labeled in the input and output shapes. FIG. 3A shows two face labels.

Edge Labels. Edge labels depend on the face labels. An edge has a face on its left side and on its right. If these two faces are labeled l and r, then the edge is labeled $\tilde{a}=(l,r,\theta)$ where $\theta$ is its tangent angle. According to this definition, edges with the same label are locally similar.

The Cut Operation. A cut splits an edge $\acute{a}$ into two half-edges labeled a and $\bar{a}$. FIGS. 3C and 3D show a cut in reverse. Half-edges are illustrated as lines that end in an empty circle. While full edges are undirected, half-edges are directed. The half-edge $\bar{a}$ points in a negative direction $\hat{\theta} \in [-180°, 0°)$. While the opposite half-edge a points in the opposite direction $\theta = \hat{\theta} + 180° \in [0°, 180°)$.

The Glue Operation. Two half-edges a and $\bar{a}$ can be glued together to form one full edge. FIGS. 3C and 3D shows two examples. Cutting and gluing are exact opposites.

Planarity. A drawing of a graph is planar if its edges do not intersect. Planarity depends on how the tangent angle changes as we follow a path around the graph. We can determine the tangent angle of each half-edge from its label a and $\bar{a}$. But the angles wrap, so that the labels alone do not tell us if the path has turned $\theta$ or $\theta+360°$ or $\theta+720°$ or more. To keep track of the angles wrapping, we define positive and negative turns as follows.

Positive Turn $\wedge$. If a path is turning counterclockwise, its tangent angle $\theta$ is increasing until it reaches 180°. At that point it wraps to $-180°$. We call this wrapping a positive turn A. We use the symbol A since the path makes a $\wedge$ shape (See FIG. 3B).

Negative Turn $\vee$. If a path is turning clockwise, its tangent angle $\theta$ wraps in the opposite direction from $-180°$ to $180°$. We call this a negative turn V. The path makes a V shape. We sometimes use exponents to describe repeated turns: $\wedge^2$ $\wedge\wedge$ and $\wedge^{-2}$ $\vee\vee$.

The Graph Boundary String. We introduce a new compact notation that fully describes the possible gluing operations assuming planarity. Each graph G has a boundary string $\partial G$. The string $\partial G$ contains every half-edge and every turn in G. For example, $\partial G$ y$\wedge\bar{ba}$ means the graph G has three half-edges: y$\bar{ba}$ and one turn: A and they appear in the order y$\wedge\bar{ba}$ as we follow a path counterclockwise around G (See FIGS. 3C and 3D). This path forms a circular loop around the graph. It is unclear where the path should start. The loop is the same no matter where it started. We treat different starting points as being equivalent by defining shifted strings to be equal: y$\wedge\bar{ba}$=$\wedge\bar{ba}$y=$\bar{ba}$y$\wedge$. Consecutive positive and negative turns cancel: a☐x$\wedge\vee$=a$\wedge$x. Since the path loops once counterclockwise, the number of positive turns minus negative turns is always 1.

Finding Locally Similar Graphs—Disassembly

Figure 4A:
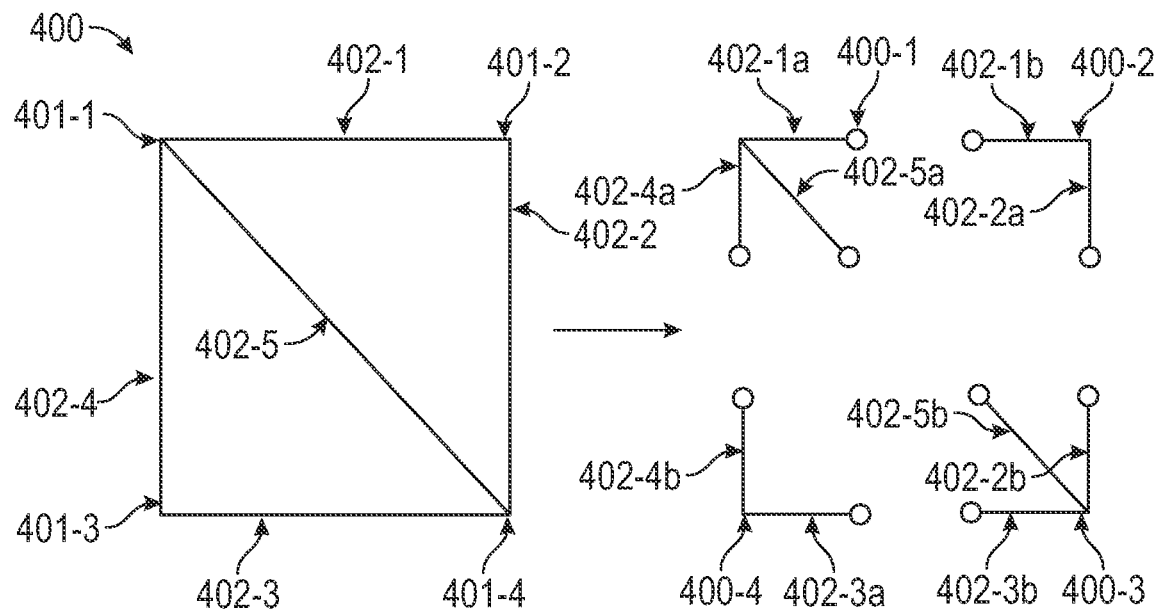
FIGS. 4A and 4B each provide an example of how an input shape can be cut into primitives.
Figure 4B:
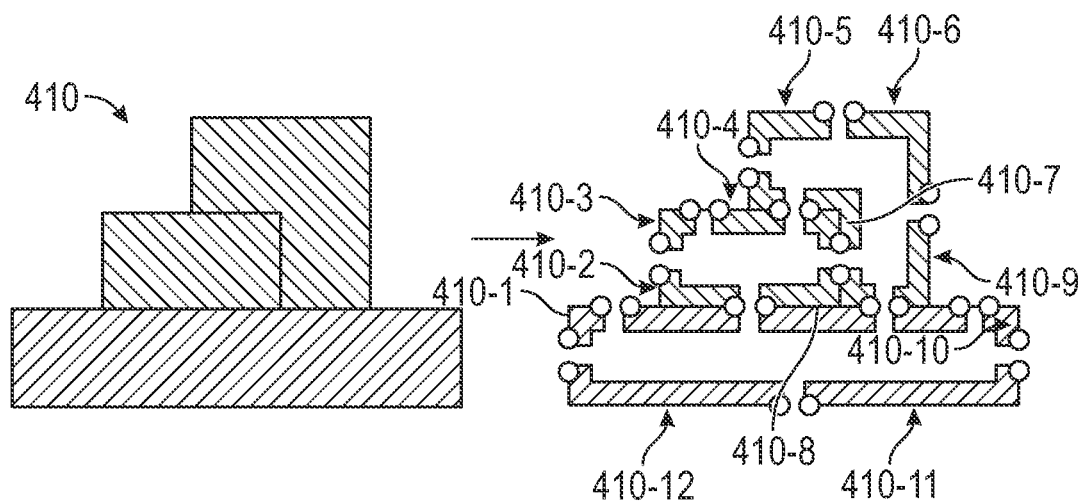

FIGS. 4A and 4B each provide an example of how an input shape can be disassembled into a collection of graphs called primitives. With reference to FIG. 4A, an input shape 400 includes four vertices 401-1 through 401-4 that are connected via five edges 402-1 through 402-5. Shape 400 can be converted into a graph without losing any essential information because the information is contained in the edge labels. This graph for shape 400 can then be disassembled by cutting it into as many pieces as possible. For example, each edge 402-1 through 402-5 can be cut into two half edges 402-1a, 402-1b, 402-2a, 402-2b, etc., and vertices 401-1 through 401-4 can be disconnected from one another. As a result, each disconnected vertex will be surrounded by half edges (e.g., vertex 401-1 surrounded by half edges 402-1a, 402-4a, and 402-5a). The resulting pieces each form a new graph which are referred to as primitives (400-1 through 400-4) because they form the most basic building blocks for the remaining process. Any graph that is assembled from primitives 400-1 through 400-4 will be locally similar to the graph for shape 400.

FIG. 4B provides another example of how a shape 410 can be disassembled into primitives 410-1 through 410-12. Again, each of primitives 410-1 through 410-12 includes a vertex of shape 410 and half edges of shape 410. In this example, each of primitives 410-1 through 410-12 also includes one or more faces which are the fill color/pattern/etc. of shape 410 adjacent the respective half edges. Any graph that is assembled from primitives 410-1 through 410-12 will be locally similar to the graph for shape 410.

Finding Locally Similar Graphs—Assembly

After the primitives are identified for an input shape, a graph hierarchy can be created based on the primitives. The graph hierarchy for an input shape can include the primitives (i.e., the most basic graphs) for the input shape as well as more complex graphs that can be created by gluing together the primitives at their half-edges.

Half-edges of primitives can be glued in two different ways, branch gluing and loop gluing. Branch gluing means the two half-edges that are glued together are on disconnected graphs with no path between them. An example of branch gluing is provided in FIG. 3C. Loop gluing means the half-edges that are glued together are on a connected graph to thereby form a loop. An example of loop gluing is provided in FIG. 3D. Loop gluing and branch gluing change the boundary string according to a simple string replacement that can be summarized as:

| Loop Glue: | $a\bar{a} \to \varepsilon$ | $\bar{a}\vee a \wedge \to \varepsilon$ |
| Branch Glue $\bar{a}B$ to a: | $a \to B\vee$ | $aB$ to $\bar{a}$: $\bar{a} \to \vee B$ | where ε is the empty string and uppercase letters like B represent arbitrary strings.

Loop gluing creates closed loops. In a planar graph, closed loops must turn 360°. Therefore, the half-edges $\bar{a}$ and a can only be loop glued if the path between them turns ±360°. When the path turns+360°, the boundary string contains the substring $a\bar{a}$ for some label a. When the path turns −360°, it contains the substring $\bar{a}va\wedge$. Gluing the half-edges removes these substrings: $a\bar{a} \to \varepsilon$ and $\bar{a}\vee a\wedge \to \varepsilon$.

In branch gluing, two graphs G and H are glued together. Let $\partial G=B\bar{a}$ and $\partial H=aC$. If the graphs are glued at the half-edges $\bar{a}$ and a, the resulting graph I has the boundary $\partial I=B\vee C$. In FIG. 2C, the boundaries $\partial G=y\wedge\bar{b}a$ and $\partial H=a\wedge xy$ are glued together to form $\partial I=y\vee\bar{b}xy$. This can be described as a string replacement in two different ways that are equivalent. If the graph $\bar{a}B$ is glued to the half-edge a, this replaces $a\to B\vee$. If the graph aC is glued to the half-edge $\bar{a}$, this replaces $\bar{a}\to\vee C$.

Figure 5:
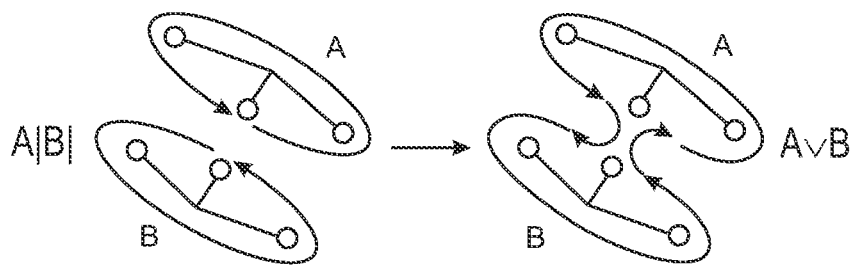
FIG. 5 provides an example of how two boundary strings can be spliced together.

Branch gluing could alternatively be described as looping gluing combined with a splice operation. The symbol | can represent splicing. The boundary strings A and B represent closed paths. A|B| means that the end of path A is attached to the start of B and the end of B is attached to the start of A. The result of a splice is $A|B|\to A\vee B$. The strings are concatenated with a turn $\vee$ added in between as represented in FIG. 5. Branch gluing Ba and aC is equivalent to a splice $B\bar{a}|aC|\to B\bar{a}VaC$ followed by loop gluing $B\bar{a}Va\wedge\wedge C\to B\vee C$.

Finding Locally Similar Graphs—The Graph Hierarchy

FIG. 6 provides an example of a graph hierarchy 600 that can be created for an input shape which in this case is a square such as is shown in FIG. 2A. Initially, each possible graph, including the primitives, is placed inside of graph hierarchy 600. Graph hierarchy 600 is divided into generations. Generation i consists of every graph that can be constructed using i gluing operations. If graph hierarchy 600 were continued forever to infinitely many generations, it would contain every possible way of gluing the primitives together and would contain every locally similar graph. Such a graph hierarchy cannot be implemented since it would be infinitely large. Thus, the graph hierarchy created at this stage should not be thought of as a concrete data structure, but rather as an abstract model (or the "abstract graph hierarchy"). The process of creating a concrete version (or finite subset) of an abstract graph hierarchy as a data structure is provided below.

Figure 6A:
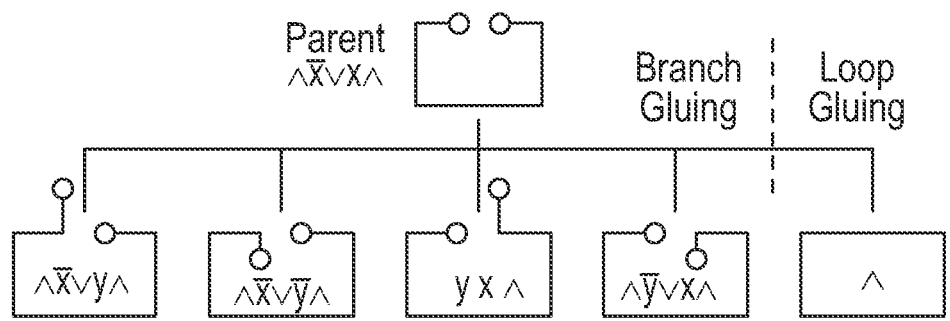
FIG. 6A provides an example of how a graph's children can be found by performing all possible gluing operations with the primitives as part of generating a graph hierarchy.
Figure 6B:
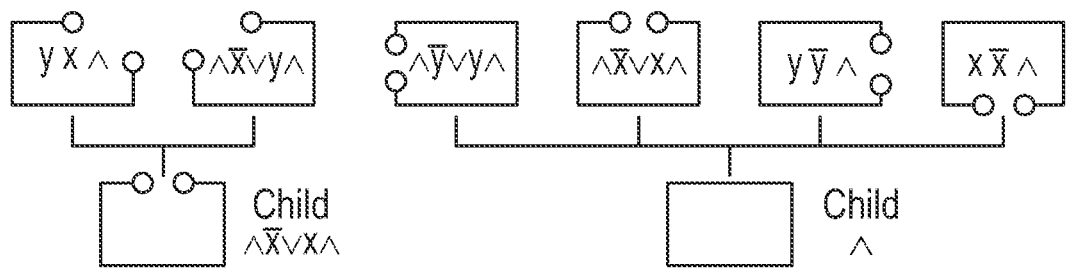
FIG. 6B provides an example of how a child graph can have multiple parent graphs as part of generating a graph hierarchy.

Referring again to FIG. 6, graph hierarchy 600 is similar to a tree in that each graph has parents, children, and descendants. However, graph hierarchy 600 is not a tree since two siblings can share a child. The simplest graphs are at the top of graph hierarchy 600. As graph hierarchy 600 is descended, the graphs grow more complex. Generation 0 contains the edge graphs and generation 1 contains the primitives. Each graph has a set of children which can be found by performing all possible loop gluing operations and branch gluing operations with the primitives as represented in FIG. 6A. A child can have multiple parents in which each of its parents is a copy of the child with one primitive cut out or on loop cut as represented in FIG. 6B.

Figure 6C:
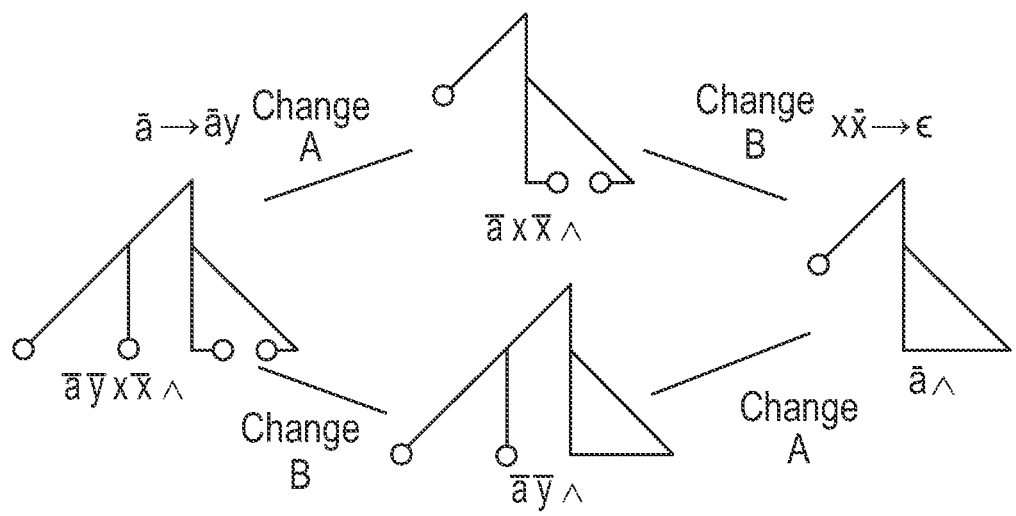
FIG. 6C provides an example of how a grandchild graph can be constructed from its grandparent graph as part of generating a graph hierarchy.

Removing Duplicates. A large graph is assembled through a series of gluing operations. Changing the order of these operations does not change the result. Suppose that a grandparent $\overline{axx}\wedge$ has two children $\bar{a}\wedge$ and $\overline{ayxx}\wedge$ and they share a child $\overline{ay}\wedge$ as represented in FIG. 6C. The grandchild can be constructed from its grandparent in two different ways. Change A could be applied first ($\bar{a}\to\overline{(ay)}$), then Change B (x($\bar{x}\to\varepsilon$) could be applied. Or B first, then A.

When implementing the graph hierarchy, there is a danger of adding different copies of a graph to each of its parents. But if all a graph's parents can be found, the graph can be added as a child of all of them. A graph's parents can be found by going back to its grandparents and then reversing the order of the two operations from grandparent to grandchild (AB to BA). This eliminates any possible duplication.

Finding Locally Similar Graphs—Gluing Complete Graphs

A graph is complete if it has no remaining half-edges left to glue. A complete graph G always has the boundary string $\partial G=\wedge$. Otherwise, the graph is incomplete. A graph hierarchy can be used in various ways to produce complete graphs. For example, one possible approach is to do a random walk through the graph hierarchy to randomly glue primitives together until reaching a complete graph by chance. This simple approach may work in some scenarios, but it is an error-prone and inefficient way to construct graphs.

Graph Grammars

In accordance with embodiments of the present invention, a graph hierarchy may be used to construct a graph grammar that can produce all complete, locally similar graphs. A graph grammar constructed in accordance with embodiments of the present invention can consist of a set of double-pushout (DPO) production rules. A DPO production rule contains a left graph L and a right graph R that replaces the left graph and defines a relationship between the left graph and right graph. This relationship may be defined in the form of an interface graph I and two morphisms: $\varphi_L$: I→L and $\varphi_R$: I→R. An example of a DPO production rule 700 is provided in FIG. 7 in which the left graph L is matched with the graph G, then the left graph L is cut from the graph G and the right graph R is glued in its place to make the graph H.

Figure 7:
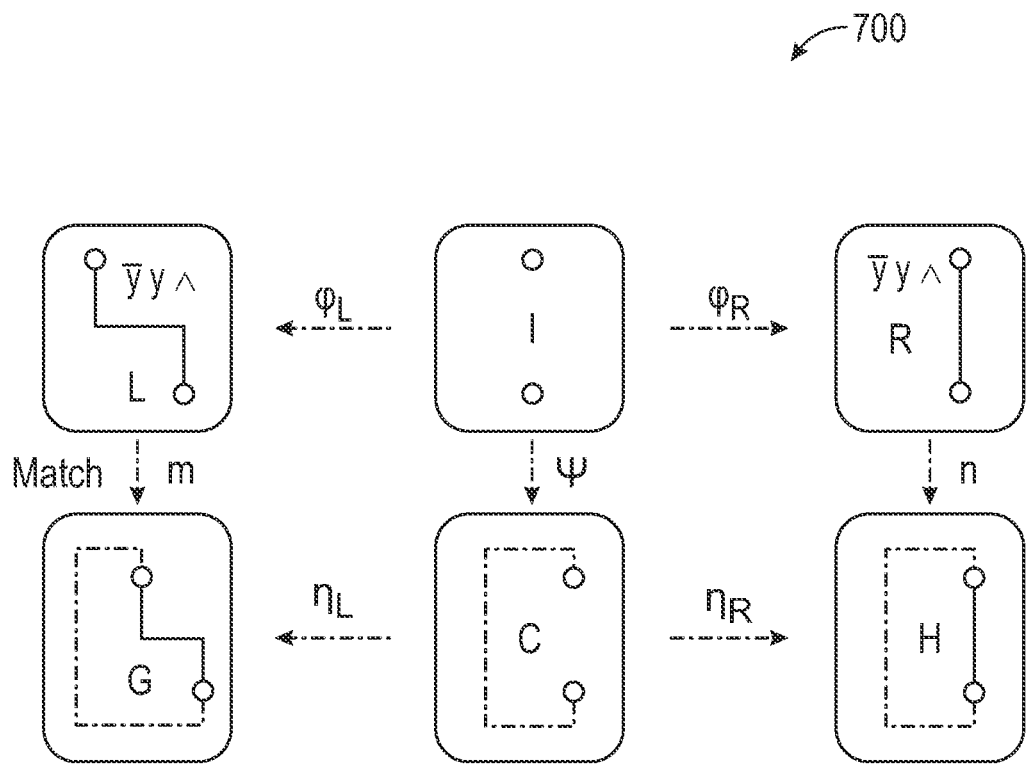
FIG. 7 provides an example of a production rule of a graph grammar that may be automatically generated in accordance with embodiments of the present invention.

Graphs L and R always have the same graph boundary string (e.g., $\partial L=R\ \bar{y}y/\wedge$ in FIG. 7). This is necessary so that R can replace L without breaking planarity. Graphs L and R have the same half-edges. Each half-edge ends in a vertex shown as an empty circle. The interface graph I consists of those vertices and the morphisms $\varphi_L$ and $\varphi_R$ map between them based on their matching half-edges. Interface I is omitted in the other figures since I can be fully determined from the half-edges of L and R.

To apply a DPO rule to graph G, a subgraph of G that matches L can be found. This is described by a morphism m called the match where m: L→G. The subgraph of G that is matched to L is cut out, and R is glued in its place. Cutting L from G produces the context graph C. Gluing R to C produces the final graph H. To summarize, a part of G is matched to L and then replaced with R to produce H.

Another perspective is that FIG. 7 consists of two graph gluing operations. On the left side, L is glued to C to make G. On the right side R is glued to C to make H. According to category theory, these two gluing operations are pushouts and this is a double pushout.

Creating A Graph Grammar—Outline

The generation of a graph grammar can be summarized using the following algorithm ("algorithm 1"):
Find Graph Grammar From Primitives Algorithm
1: Starting from primitives, glue graphs together to build a concrete graph hierarchy ideally until every complete shape is reducible.
2: for each graph G do
3: If possible, use G in a rule either to reduce G using other graphs or to reduce another graph using G
4: if G has no complete descendants then
5: Remove G and all its descendants The input to algorithm 1 is a set of primitives. The output is a set of DPO production rules that make up a graph grammar. Initially, a graph hierarchy can be built incrementally starting from the primitives using the same branch gluing and loop gluing operations described above. Before each graph G is added to the graph hierarchy, it can be determined if it is possible to create a DPO production rule that will simplify G. If a graph G can be simplified by a DPO production rule, G is determined to be reducible and is removed from the graph hierarchy. Each time a graph G is to be added, it can be checked if the graph can be simplified or if the graph can be used to simplify another graph.

Graphs can be ordered in the graph hierarchy from simple to complex. Graphs with fewer half-edges are simpler than those with more. If two graphs have an equal number of half-edges, then the graphs are ordered according to the graph hierarchy. Graphs added earlier in the hierarchy are simpler than those added later. This can be used to order the graphs in each rule. The right side R of a rule is always simpler than the left L. A graph is reducible if it is on the left side of a rule. A rule can split a graph L into multiple simpler graphs on the right R. Once every complete graph is reducible, the graph grammar is capable of constructing every locally similar graph. It is possible that a graph has an infinite number of irreducible descendants that are all incomplete. These graphs can be detected and removed along with their descendants.

Creating A Graph Grammar—Operation of Algorithm 1

Figure 8:
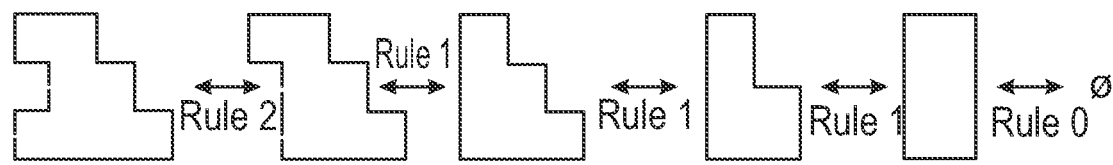
FIG. 8 provides an example of how production rules of a graph grammar can be applied as part of identifying reducible graphs.

An important property of DPO graph grammars is that all production rules are invertible. Each rule can transform a left graph into a right graph: L→R, or it can be reversed to transform a right graph into a left graph: R→L. By convention, the simpler graph is on the right R, so that applying a rule L→R will simplify any graph that it is applied to G→H. Applying a rule L→R is destructive because it deconstructs the graph into simpler parts. Applying it R→L is constructive because it constructs a more complex graph. FIG. 8 shows rules being applied destructively i.e. a complex graph is reduced to a simple one. The simplest graph is the empty graph Ø. If a simple graph can be deconstructed from a complex one, the reverse is also true. By reversing each step in FIG. 8, a complex graph is constructed from the empty graph.

A graph can always be reduced to a set of irreducible graphs. If a graph is reducible, it can be reduced to another graph. If that graph is reducible, it can be reduced to an even simpler graph. This is a proof by infinite descent. The graphs can continue to be reduced ad infinitum until an irreducible graph is reached.

Algorithm 1 continues adding production rules until every complete graph is reducible. At that point, the only irreducible graph left is the empty graph Ø. Every complete graph can be reduced to Ø. And since every destructive action can be reversed, the reverse is also true. Every complete graph can be constructed from the empty graph Ø. At that point, the graph grammar can construct every complete, locally similar graph and algorithm 1 terminates.

Reducing All Descendants.

Figure 9:
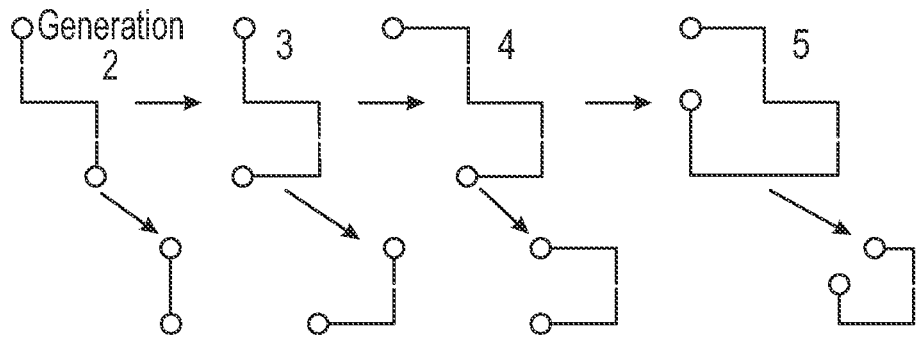
FIG. 9 provides an example of how a graph and its descendants can be reduced using a production rule.

If a rule can be applied to L, it can be applied to all of L's descendants because its descendants contain L as a subgraph (e.g., L's descendants are found by gluing primitives to L). Ordinarily, if L can be reduced by some rule, then all of L's descendants can be reduced by the same rule. (There is an important exception to this statement discussed below). FIG. 9 provides an example of how a graph L (and all its descendants) can be reduced by Rule 1 (see FIG. 6).

Creating A Graph Grammar—Finding a Rule to Reduce a Graph

Production rules can be found by matching boundary strings. A graph R can replace a graph L if both graphs have the same boundary string ∂R=∂L. For example, in FIG. 7, OR=∂L=ȳy∧. Similarly, the five rules in FIG. 6, have the same boundary strings on the left and right sides. When two graphs L and R have the same boundary strings, they can seamlessly replace one another. Their half-edges are the same, so each of L's half-edges can be cut out and replaced by one of R's half-edges. They also have the same turns A and V so the paths between the half-edges turn the same. They have the same total curvature. This is necessary to preserve planarity.

A given boundary string ∂L can be matched to a graph R with the same boundary ∂R=∂L. The boundary string could also be matched to a set of graphs $\{R_1, R_2, \ldots\}$. This set matches L if the strings $\{\partial R_1, \partial R_2, \ldots\}$ can be combined to equal ∂L. The following recursive divide-and-conquer algorithm (findMatchingGroups or "algorithm 2") can be used for this purpose:
findMatchingGroups(∂L): ∂L is a Boundary String

```
1:    for each graph R with boundary ∂R in the hierarchy do
2:        for each way of matching ∂R with \/"∂L/\" for some n do
3:            matches = [R]
4:            for each unmatched substring ∂L_i do
5:                matches.push(findMatchingGroups(∂L_i/\));
6:            if all matches successful then
7:                return matches
8:    return null
```

Figure 10:
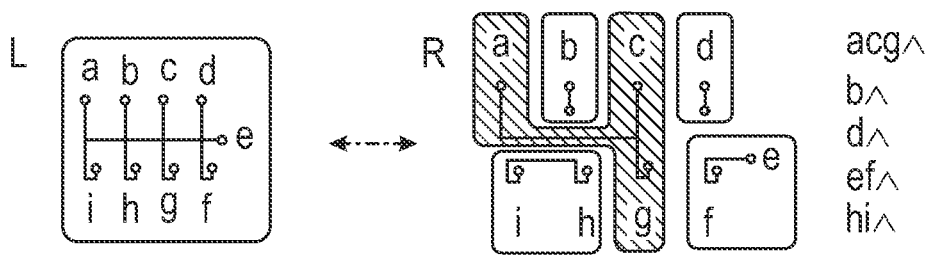
FIG. 10 provides an example of a graph being matched to a set of other graphs.

For example, suppose that graph L has the boundary ∂L=abcdefghi∧ as shown in FIG. 10. Algorithm 2 tries to match L using every graph R in the hierarchy. It tries to match each ∂R to some part of ∂L. As an example, if ∂R=acgA, then after matching OR to ∂L, three unmatched substrings remain: b, def, and hi. Algorithm 2 runs recursively on each substring. One solution might be to match ∂L=abcdefghi∧ to acg∧, b∧, d∧, ef∧, and hi∧ assuming those graphs are in the graph hierarchy.

Figure 11:
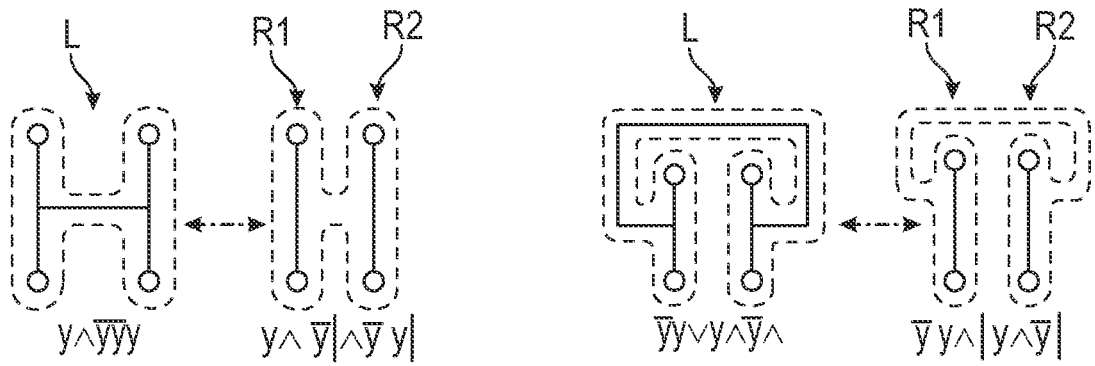
FIG. 11 provides an example of how two graphs are spliced together in different ways to produce different left graphs.

The boundary strings $\{\partial R_1, \partial R_2, \ldots\}$ are combined by splicing them together. When two boundary strings are spliced, an extra turn V is added between them:

$\partial R_1|\partial R_2|\rightarrow \partial R_1\vee\partial R_2$. In fact, there are multiple ways to splice two strings together. FIG. 11 provides two examples where the same right graphs $R_1$ and $R_2$ are spliced together in different ways to produce different left graphs: $y\wedge\overline{y}yy$ and $\overline{y}y\vee/y\wedge\overline{y}\wedge$.

When two strings are spliced together, extra turns can be added between them. The splice operation can be written more generally as $A|B|\rightarrow A\wedge^n B\vee^{n+1}$ for some $n\in\mathbb{Z}$.

Suppose we have matched OR to part of $\partial L$. And let $\partial L_i$ be the unmatched part so that $\partial L=\partial R\partial L_i$. Some string can be spliced to OR to get $\partial L$. This formula gives the desired result: $\partial R|\vee^n\partial L_i\vee^{n+1}|\rightarrow\partial R\partial L_i=\partial L$. Consequently on line 2 of Algorithm 2, OR is matched with $\vee^n\partial L\wedge^n$ and on line 5 is matched with $\partial L_i\wedge$. In this example, the unmatched substrings are: b, def, and hi and they were matched to b$\wedge$, def$\wedge$, and hi$\wedge$. The extra $\wedge$ cancels with the $\vee$ that is added during splicing.

Figure 12:
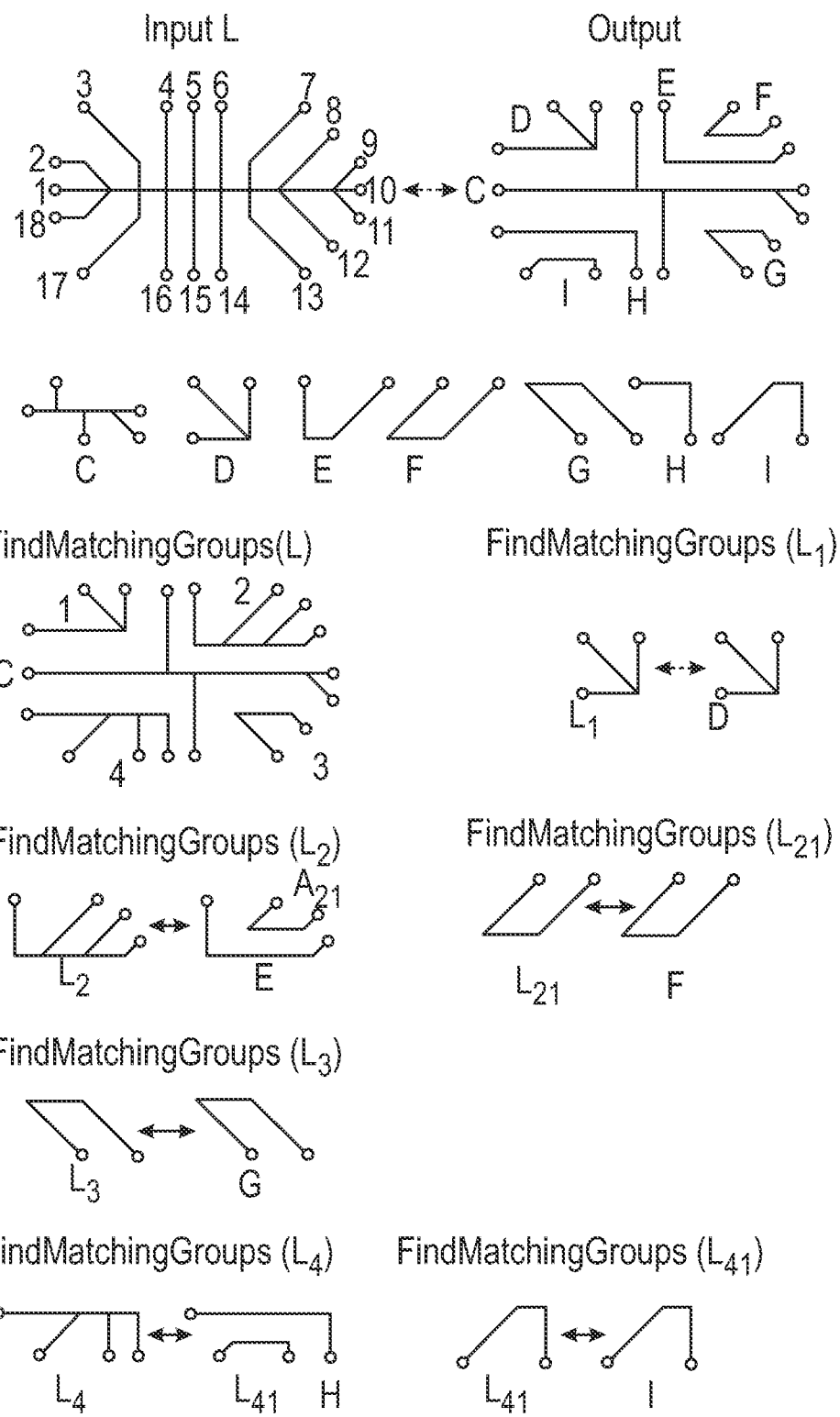
FIG. 12 provides an example of how an algorithm can be run recursively to identify a set of graphs that match an input graph.

FIG. 12 provides another example of how algorithm 2 can be employed on a more complex input graph L to generate an output graph. In this example, it is assumed that the graphs C to I are in the graph hierarchy.

First, a graph R can be found that can match all of its half-edges to some of L's half-edges. Every possible graph C to I could be tried. If graph R=C, algorithm 2 can match the half-edges from $\partial C$ to $\partial L$. There are multiple ways to match the two graph boundary strings $\partial C$ and $\partial L$. Graph C's half-edges can be matched to the half-edges (1, 5, 10, 11, 14) of graph L. They can also be matched to (1, 4, 10, 14, 15) or (1, 5, 10, 11, 15) and several other possible ways of matching the half-edges can be tried.

Graph C has 5 half-edges. Graph L has 18 half-edges. The remaining 13 half-edges must be matched to have a valid solution. The boundary string L is split until producing substrings containing the remaining half-edges $\{\partial L_1, \partial L_2, \dots\}$ and algorithm 2 is run recursively on each group. Each group consists of a set of consecutive half-edges that have not been matched. For example, if the half-edges (1, 5, 10, 11, 14) of graph L are matched to graph C (See (c) of FIG. 12), then there are four groups of remaining graphs to match labeled $L_1$ to $L_4$. $L_1$ has the half-edges 2 to 4. $L_2$ has 6 to 9, $L_3$ has 12 to 13, and $L_4$ has 15 to 18. Algorithm 2 can be run recursively on each group by calling algorithm 2 on $L_1$ to $L_4$. The result is only acceptable if a match is found for all four groups. FIG. 12 at (d) shows algorithm 2 being run recursively on each group. Group $L_1$ is matched to graph D. Group $L_2$ is matched to graph E, but graph E only matches half-edges 6 and 9. Group $L_2$ contains two more half-edges that must be matched (half-edges 7 and 8), so algorithm 2 is run recursively to find a match for them. They are then matched to graph F. Groups $L_3$ and $L_4$ are matched in a similar way.

A special case arises when graphs are complete. A complete graph G has no half-edges and has the boundary string $\partial G=\wedge$. For every complete graph, a rule that deletes the graph can be defined like Rule 0 in FIG. 6. These are called starter rules. Like other grammars, graph grammars have an axiom or a start graph that they begin with and then rules are applied to derive new graphs. In algorithm 2, the start graph is an empty graph $\emptyset$. Initially, the starter rules are the only rules that can be applied.

Creating a Graph Grammar—Reducing a Graph with its Descendants

Figure 13A:
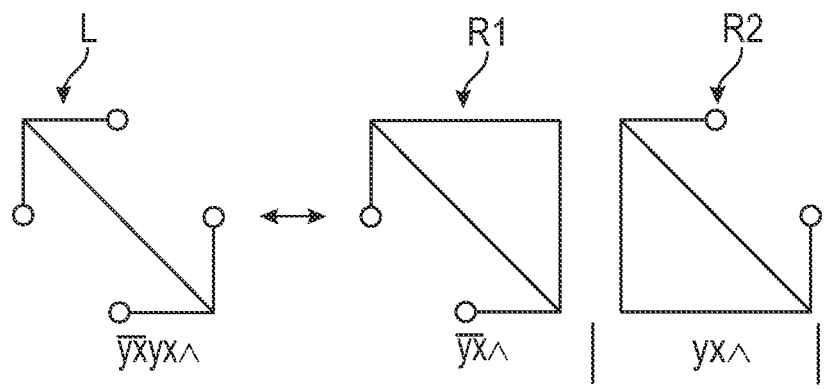
FIG. 13A provides an example of a rule that can reduce a graph in a graph hierarchy to two simpler graphs.

If a rule simplifies the graph L into the graphs $R_1$ and $R_2$, it would ordinarily mean that L and all its descendants are reducible. However, if $R_1$ is a descendant of L, the rule does not reduce every descendant of L since applying the rule to $R_I$ replaces $R_I$ with itself. This does not simplify $R_1$. For example, FIG. 13A provides an example where a rule reduces the left graph $\partial L=\overline{y}xyx\wedge$ into two simpler right graphs $\partial R_1=\overline{y}x\wedge$ and $\partial R_2=yx\wedge$. $R_1$ and $R_2$ are simpler than L since they have two half-edges and L has four. $R_1$ and $R_2$ contain L as a subgraph, so they are descendants of L.

Figure 13B:
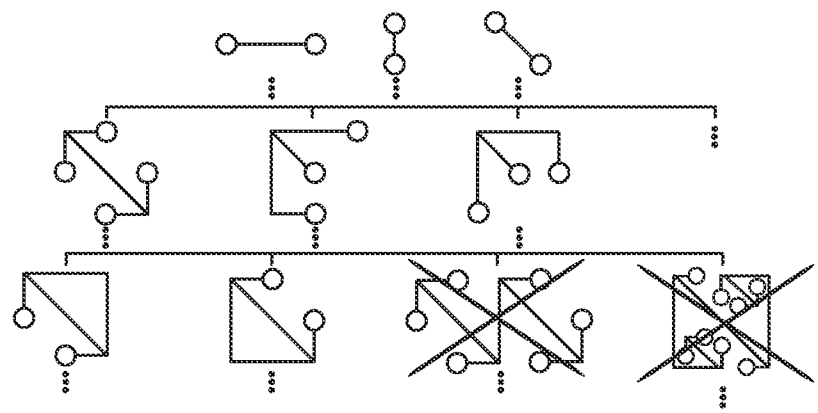
FIG. 13B provides an example of how a graph hierarchy can be updated when a rule is applied to reduce a graph into simpler graphs.

However, this rule is still useful because it can reduce all descendants of L besides those that are descendants of $R_1$ and $R_2$. The graph hierarchy can then be restructured by removing L and its descendants from the graph hierarchy and replacing them with $R_1$ and $R_2$ and their descendants. Accordingly, this rule can turn every descendant of L into a descendant of $R_1$ and $R_2$ as represented in FIG. 13B.

Figure 13C:
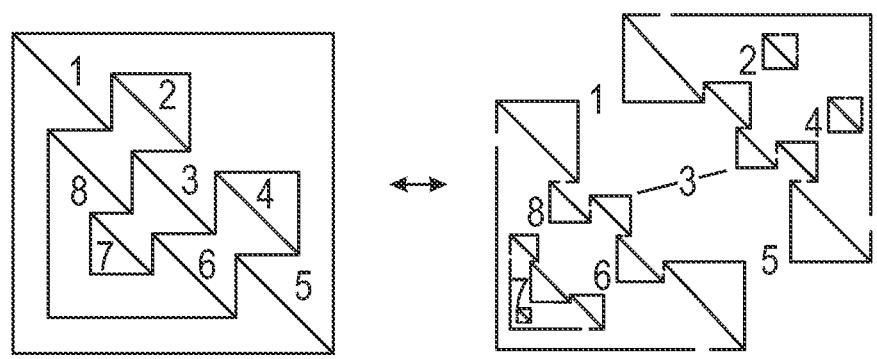
FIG. 13C provides an example of how the rule in FIG. 13A can be applied to simplify complex shapes in a graph hierarchy.

Applying this rule can simplify complex shapes. For example, FIG. 13C represents a scenario where the rule is applied eight times resulting in a graph that consists only of $R_1$ and $R_2$ glued together which can be reduced with a few additional results.

This scenario only happens occasionally. In most cases, algorithm 2 can finish without using any rules that contain descendants of L on the right side of the rule. Often this technique reduces the number of rules, but algorithm 2 can finish without it.

Creating a Graph Grammar—One-Half-Edge Graphs, Stubs

If a graph has one half-edge, its boundary string is $a\wedge$ or $\overline{a}\wedge$ for some label a. These graphs are referred to as stubs. If the stub $a\wedge$ is glued to half-edge $\overline{a}$, then $\overline{a}\rightarrow\wedge\vee=\varepsilon$. Stubs often exist. If the input graph has no cycles, then a pair of stubs $a\wedge$ and $\overline{a}\wedge$ exists for every label a. Even when the input graph has only cycles, stubs often exist. Algorithm 1 finds any stubs that can be created since the graph hierarchy checks every locally similar graph. Algorithm 1 finds stubs that are not in the primitives and are not part of the input graph.

Figure 14A:
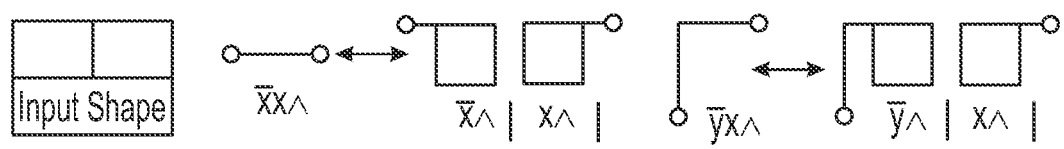
FIG. 14A provides an example of how stubs can be found as part of building the graph hierarchy.

Stubs are very useful for deconstructing graphs. If the stubs $a\wedge$ and $\overline{a}\wedge$ exist, every primitive and every edge that has the label a can be deconstructed. For example, FIG. 14A illustrates an input shape that contains no stubs. But when the graph hierarchy is built, stubs that can deconstruct all the primitives are found.

Figure 14B:
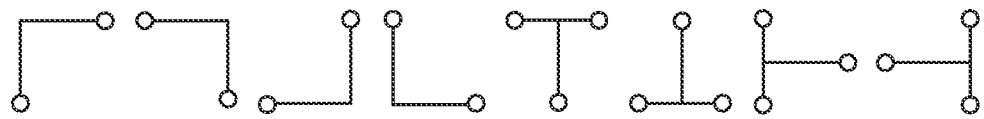
FIGS. 14B and 14C show original primitives and primitives that have been deconstructed using stubs respectively.
Figure 14C:
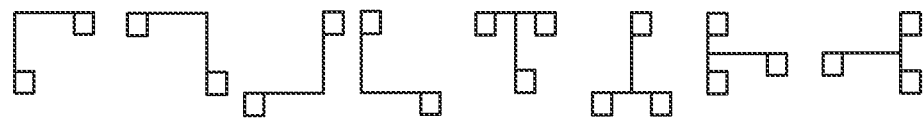

The approach outlined in the previous section (Graph Grammars—Reducing a Graph with Its Descendants) applies in this scenario since the stub $x\wedge$ is a descendant of the primitive $\overline{y}x\wedge$ and it can also deconstruct $\overline{y}x\wedge$. Every primitive and every graph can be deconstructed into the four stubs: $x\wedge$, $\overline{x}\wedge$, $y\wedge$, and $\overline{y}\wedge$. The original primitives are shown in FIG. 14B and the deconstructed primitives are shown in FIG. 14C.

Figure 15:
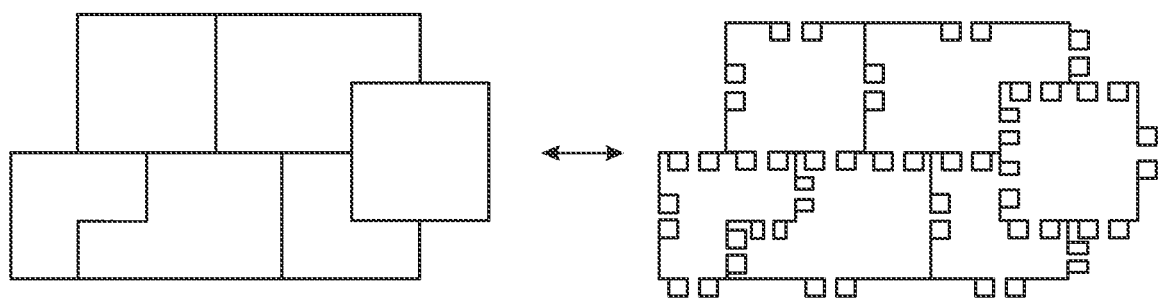
FIG. 15 provides an example of a shape that is deconstructed using stubs.

As another example, FIG. 15 shows a shape that is deconstructed by applying the rules $\overline{x}x\wedge\rightarrow\overline{x}\wedge|x\wedge|$ and $\overline{y}y\wedge\rightarrow\overline{y}\wedge|y\wedge|$. The remaining graphs can be deconstructed by 8 starter rules. In this case, the stubs alone solve the problem.

Creating a Graph Grammar—No Complete Irreducible Descendants

Figure 16:
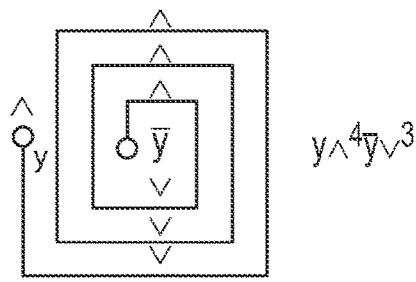
FIG. 16 provides an example of a graph that cannot be reduced.

The graph hierarchy may contain graphs that cannot be reduced. For example, if graph hierarchy 600 shown in FIG. 6 were continued several more generations, graph $y\wedge^4\overline{y}\vee^3$ shown in FIG. 16 would appear in the graph hierarchy.

Not only is the graph $y\wedge^4\overline{y}\vee^3$ irreducible, it is part of an infinite set of irreducible graphs of the form $y\wedge^{n+1}\overline{y}\vee^n$ for some n. Graph hierarchy 600 of FIG. 6 contains no stubs. Each graph can only be completed by forming a path that turns 360° and then loop gluing it. The path from y to $\overline{y}$ has 4 counterclockwise turns $(\vee^4)$. The only way to form it into a loop is for it to turn it clockwise. But if anything is glued to the path to turn it clockwise, the resulting graph can be reduced by one of the rules of graph hierarchy 600. Therefore, every descendant of $y\wedge^4\bar{y}\vee^3$ is reducible or incomplete. It is necessary to detect and remove graphs with only reducible or incomplete descendants. Otherwise, it is uncertain whether the graph grammar can reduce every complete graph.

Figure 17A:
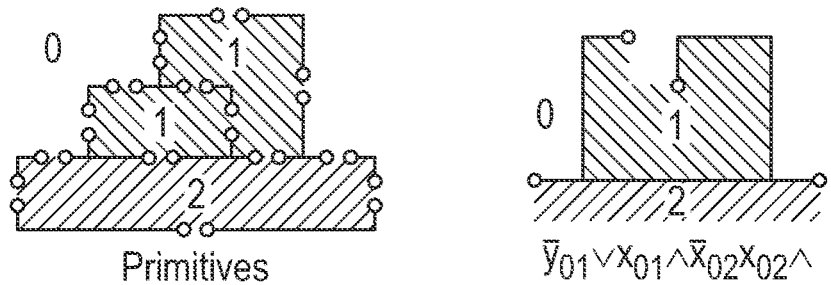
FIG. 17A provides an example of a graph that has no complete descendants.
Figure 17B:
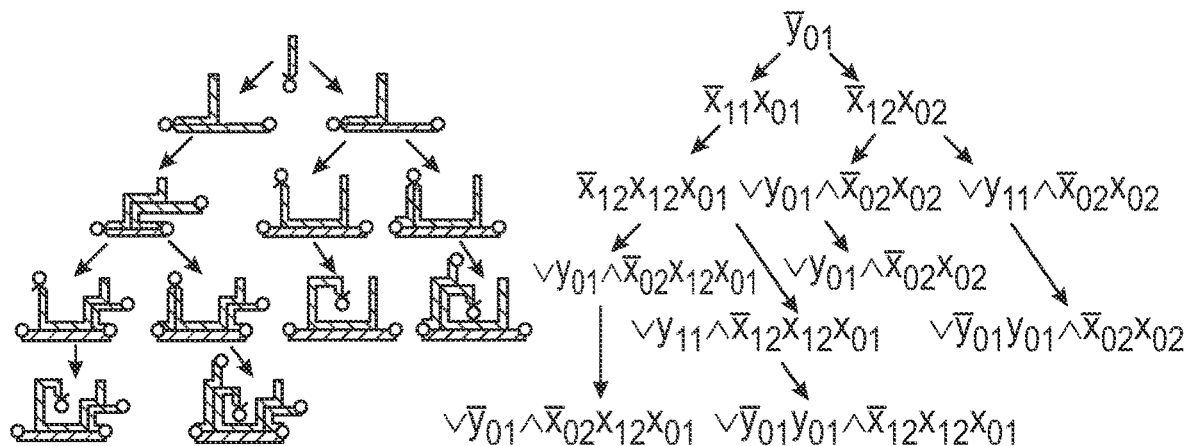
FIG. 17B is a decision tree showing the result of every possible gluing operation for the graph of FIG. 17A.

A more complex example is provided in FIGS. 17A and 17B. FIG. 17A shows the graph $\bar{y}_{01}\vee/x_{01}\wedge\bar{x}_{02}x_{02}\wedge$ which has no complete descendants. Notably, the half-edge $\bar{y}_{01}$ is pointed in the −y direction and is adjacent to the faces labeled 0 and 1. A graph can be completed if there is some sequence of gluing operations that can transform the boundary string to A. This is impossible in this scenario because there is no way to glue the half-edge $\bar{y}_{01}$. For example, FIG. 17B is a decision tree showing the result of every possible graph gluing operation starting with $\bar{y}_{01}$.

No matter which choice is taken, it never gets closer to completing the graph. Gluing has the effect of doing a string replacement. In particular, as the first half-edge is repeatedly replaced, it returns to $\bar{y}_{01}$ as the first half-edge and adds a turn in the wrong direction. Every path down the decision tree cycles: $\bar{y}_{01} \to \bar{x}_{11} \to \bar{x}_{12} \to \vee/y_{01}\wedge\bar{y}_{01}\wedge$ without getting any closer to completing the graph. It is impossible to complete the graph $\bar{y}_{01}\vee/x_{01}\wedge\bar{x}_{02}x_{02}\wedge$.

It can be guaranteed that all a graph's descendants are reducible or incomplete if: (1) it contains a half-edge that has turned more than 360° from the previous or next half-edge; and (2) the total curvature stays above 360° through every path that descends from the graph. Considering that every sufficiently long path must end either in a stub or be part of a string replacement cycle, that means (3) none of the paths ends in a stub and (4) every cycle has positive or zero curvature. If these conditions are met, the graph cannot be completed, and it has no complete descendants. The graph and all its descendants are therefore removed from the graph hierarchy.

Creating a Graph Grammar—the Growth of the Graph Hierarchy

For some graph hierarchies, it can be very difficult to track down and conclusively show that every complete graph is reducible. There are simply too many ways that the graphs can spiral in on themselves. A simple solution is to limit the number of generations or half-edges in the hierarchy or to ignore graphs that have turned more than 360°. The downside is that it can no longer be certain that the graph grammar can produce every locally similar graph. The remaining irreducible graphs are very complex spiraled shapes.

This is more of an issue when algorithm 2 is extended to 3D shapes. For 2D shapes, the size of the graph hierarchy need be limited only in a few cases. However, even in such cases, the graph grammars still produce a rich variety of shapes and, as a practical matter, fulfill the desired goals.

Creating a Graph Grammar—Grouping Vertices

Figure 18:
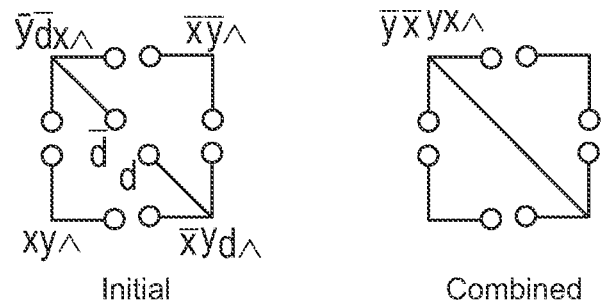
FIG. 18 provides an example of how primitives can be glued together to group vertices.

In some embodiments, the creation of the graph grammar may be more efficiently performed by grouping vertices. FIG. 18 shows an example where the half-edges x appears in two primitives. The opposite half-edge $\bar{x}$ can be glued to one of those two primitives. The same is true for y and $\bar{y}$. However, the diagonal half-edges d and $\bar{d}$ each only appear in one primitive: $\bar{y}dx\wedge$ and $\bar{x}yd\wedge$. Therefore, these two primitives must be glued together given that there are no other options. Rather than starting with four initial primitives, two of the primitives can be glued to form $\bar{y}xyx\wedge$. Then, the three primitives $\bar{y}xyx\wedge$, $\bar{x}y\wedge$, and $xy\wedge$ can be used as the starting point. Algorithm 2 can derive the same graph grammar from either set, but it is more efficient to combine them.

Creating a Graph Grammar—Grouping Edges

Figure 19:
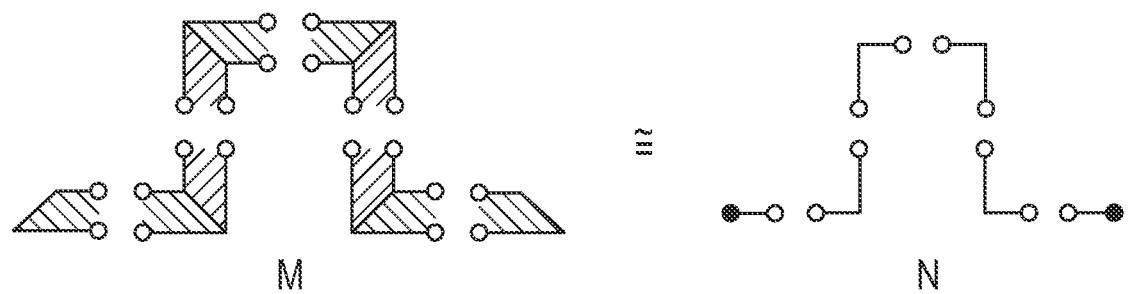
FIG. 19 provides an example of how a set of primitives can be replaced with a simpler set.

In some embodiments, the creation of the graph grammar may be more efficiently performed by grouping edges. FIG. 19 shows an example set of primitives M. For each of these primitives, the horizontal and vertical half-edges come in inseparable pairs. If one half-edge is glued to a primitive, the other half-edge must be glued to the same primitive. Otherwise, the shape will spiral forever and will not form a complete shape. Each pair of half-edges can only be glued to another pair. The pair of half-edges acts as a single unit, like a single half-edge. The set M is isomorphic to a simpler set, N, in which each pair is replaced by a single half-edge. The set N has fewer half-edges and is easier to solve.

Creating a Graph Grammar—Special Cases

Infinitely-Long Lines. In some cases, it may be desirable if the output shapes contain lines that do not end. For example, a line for the ground extends indefinitely. However, output shapes are generated within a finite space. To address this, the border of the space can be treated as part of the input shape. Lines that extend infinitely far can be modeled as lines that intersect this border.

Connected Shapes.

In some cases, it may be desirable for an output graph to be fully connected. This can be done by (1) not allowing starter rules to be used more than once, and (2) disallowing rules that use multiple spliced graphs.

No Loops.

In some cases, it may be desirable if the output shapes do not contain loops such as for streams and trees. This can be done by (1) disallowing loop gluing and (2) disallowing rules that use multiple spliced graphs.

Using the Graph Grammar

Once a graph grammar is created, it can be used to generate a graph drawing as generally represented by Algorithm 3 below:

Generate Graph Drawing from Graph Grammar

```
1:   Start with an empty graph Ø.
2:   for n = 1 to N do
3:       Propose a change to the graph using a rule.
4:       for i = 1 to I and not accepted do
5:           Find the space of consistent graph drawings: x̂ + K_4Λ
6:           for j = 1 to J and not accepted do
7:               Sample from the space x̂ + K_4Λ
8:               if sample is acceptable then
9:                   accept new graph drawing
10:                  accepted = true
11:          if not accepted then
12:              Free a vertex. Allow its position to change.
```

As an overview, in algorithm 3, the graph grammar is used to go on a random walk through the space of complete locally similar shapes. Algorithm 3 begins with an empty graph Ø and changes it incrementally. At each iteration, algorithm 3 proposes a change to the graph using a rule (Line 3). Each rule specifies what edges and vertices to add or remove, but it does not specify the vertex positions. By setting vertex positions, an angle graph becomes a graph drawing. Algorithm 3 proposes a set of vertex positions (Line 7) which are then accepted or rejected (Line 8). While this is a random process, it can be guided by being selective in which proposals are accepted.

Using the Graph Grammar—Propose an Angle Graph

At each iteration, algorithm 3 proposes a change to the graph using a production rule. Each DPO rule is bidirectional and can be applied constructively R→L or destructively L→R. Algorithm 3 applies the rules in both directions with no preference on the direction.

To apply a rule, algorithm 3 matches part of the existing graph to the left L or right side R of a rule. The match m is a morphism (see FIG. 7) that maps from the left side L to the existing graph G. Determining if a morphism exists between two arbitrary graphs is an NP-hard problem, but the graphs are all planar and planar graphs can be matched in linear time. When a match is found, the left or right side is cut out and replaced by the opposite side. There is one special case. A starter rule has an empty graph on its right. Starter rules can create graphs from nothing or delete graphs to nothing.

Using the Graph Grammar—Propose a Graph Drawing

The next step is to propose a planar graph drawing. Graph grammars created in accordance with embodiments of the present invention guarantee that all closed loops turn ±360°. This is a necessary but not a sufficient condition for a planar graph drawing to exist. For a given angle graph, a planar graph drawing may not exist and deciding if it exists is NP-hard. But there are many exceptions. The problem can be solved in linear time if the graph is a tree, a simple cycle, or a series-parallel graph.

Algorithm 3 makes small incremental changes to an existing graph drawing. Ideally, only the positions of vertices added by the production rule would be set and no other vertices would be moved, but sometimes it is necessary. Algorithm 3 repeatedly attempts to create a planar graph drawing (Lines 4-12). If these attempts fail, algorithm 3 tries a new rule at a new location. Because this problem is NP-hard, the possibility that it may be exceptionally difficult to produce a planar drawing for some input shapes cannot be ruled out. In any case, algorithm 3 makes small incremental changes and exits early if any particular angle graph is difficult to solve.

The eventual goal is to produce a graph drawing that satisfies all requirements listed below. But first it is necessary to find the space of possible solutions. This includes finding the nullspace of a linear system.

The angle of each edge must agree with its label. Each edge label $\acute{a}=(l,r,\theta)$ specifies an angle $\theta$. If $u=[\cos \theta, \sin \theta]$ is the direction of an edge that goes between two vertices located at $v_0$ and $v_1$, then $v_1=v_0+su$ for some edge length s. This is the equation for one edge. The equations for all the edges can be combined into one matrix equation $Ax=b$ where x is a column vector of the vertex positions and edge lengths.

The equation $Ax=b$ may have many solutions or it may have none. If matrix A has a nullspace, $K_A$ can be a basis for this nullspace. If $\hat{x}$ is a solution, then $\hat{x}+K_A\Lambda$ is also a solution for any $\kappa$. Solutions can be proposed by sampling from the solution space $\hat{x}+K_A\kappa$.

Figure 20:
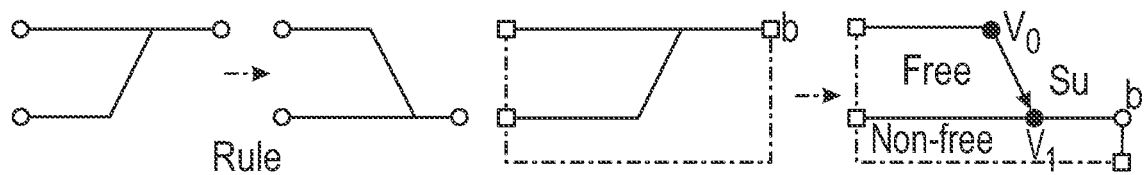
FIG. 20 provides an example of how a vertex can be freed to allow a set of linear equations to be used.

On the other hand, $Ax=b$ may not have a solution. The vertex positions may be overconstrained. This is the potential problem with the initial strategy of moving as few vertices as possible. In this case, it is necessary to move more vertices and an iterative approach can be used. At each iteration i, there are a set of free vertices whose position can change. While the vertices are overconstrained, a non-free vertex that is adjacent to a free vertex can be picked and turned into a free vertex (Line 12) as represented in FIG. 20. Its position is now a free variable in the equations and so are the lengths of any adjacent edges. A and b can then be updated accordingly. This gives additional degrees of freedom which can turn an overconstrained problem into a solvable problem.

Using the Graph Grammar—Accept or Reject Proposal

The graph drawing must satisfy four requirements: (1) the edges must have the correct angle, (2) the edge lengths must be positive and fit within a specified range, (3) the drawing must be planar (i.e., the edges must not intersect), and (4) the drawing must not be rejected by the Metropolis algorithm. (4) is optional. For requirement (2), the user can specify length requirements. Alternatively, the length requirements could be inferred from training data. The user can specify minimum and maximum edge lengths. The user could strictly set the edge length to one particular value, or require it to be an integer multiple of some length. This is useful for tiled patterns like windows or stairs.

Requirement (1) is satisfied by any solution of the form $\hat{x}+K_A\Lambda$. Together requirements (1) and (2) have the same form as a linear programming problem consisting of a set of linear constraints and inequalities. But unlike linear programming, this is a sampling problem, not an optimization. The sampling is from the space of locally similar shapes, and not optimizing for any particular edge lengths. Rejection sampling can be used. Solutions of the form $\hat{x}+K_A\Lambda$ can be used and samples that do not satisfy the requirements can be rejected. If J samples are rejected, algorithm 3 can move onto a new proposal.

Requirement (4) is an optional way of optimizing the graph drawing using a cost function. Algorithm 3 can accept or reject the new drawing based on a probability determined by the Metropolis-Hastings Algorithm. The cost function is arbitrary and optimization can be made for any property. The desired density of the geometry or a particular edge label that is desirable to see more or less frequently can be specified.

Using the Graph Grammar—Decorated Graph Drawings

The final step is to add decorations to the graph drawings. This is optional. This allows us to use a simplified representation that acts as a proxy for a more detailed final result. The user can specify images or geometry that should be added or tiled.

Bending.

The user can also allow some edges to bend. To bend the edges, each edge in the graph can be traversed, divided into small segments and bent by a random angle. The result is a new bent graph drawing. But this is just an intermediate solution since the bending can break some of the cycles in the drawing. The final positions are found using linear least squares. The optimal positions are found such that the change in position between two adjacent points matches the bent drawing as closely as possible while preserving all cycles.

Using the Graph Grammar—Brushes

Artists often use brushes to paint colors on a canvas both digitally and in the real world. Similarly, artists can use embodiments of the present invention to "paint" shapes onto surfaces. In particular, artists can use shapes to quickly derive a graph grammar and then use these grammars in various brushes. For example, an artist could design a highway brush or a skyscraper brush. Wherever the user applies such brushes, a highway or skyscraper will appear. Using the graph grammar, the desired shapes can be created and intelligently connected together in a way that preserves local similarity.

This may be accomplished by combining the graph grammars with an optimization like the Metropolis algorithm. Each time the user adds a brush stroke, the cost function changes so that if the desired shapes appear in the desired area that will lower the cost function. The optimization then modifies the existing shapes to lower the cost function as much as possible and produces the desired shapes in the desired area.

Extension to 3D Shapes

Up to this point, the description has focused on 2D shapes. However, embodiments of the present invention can be extended to generate 3D shapes with a few changes. In 3D, the input and output shapes consist of 3D vertices, edges, faces, and volumes. This can be represented as a graph with the edges labeled based on the adjacent faces and volumes. In the 2D case, the boundary ∂G was a 1D path around a 2D graph G. But in the 3D case, the boundary ∂G is a 2D surface. In the 2D case, the boundary ∂G could be represented by a 1D string because it was 1D. But in the 3D case, the boundary ∂G is a 2D graph. When moving the graph G to the boundary ∂G, in essence one dimension is lost. A 3D graph G has a 2D boundary graph ∂G. The 2D faces of G intersect ∂G along 1D edges. The 1D edges of G intersect ∂G at 0D points. These are the points that have been illustrated as empty circles at the end of each half-edge.

The algorithm is very similar in 2D and 3D. The input shape is disassembled into primitives. The primitives are glued together to form a graph hierarchy. Loop gluing is possible when two half-edges sharing a common face turn ±360°. A coordinate system can be defined for each face from which tangent angles θ and positive $\wedge$ and negative $\vee$ turns can be computed. In 2D, graph grammars are found by matching boundary strings. In 3D, the boundary is a graph, so graph isomorphisms are found instead.

Figure 21:
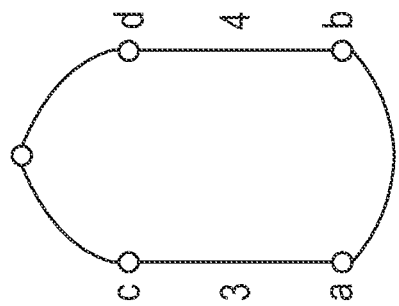
FIG. 21 provides an example of how a splice operation can be performed in the context of a 3D shape.
Figure 21:
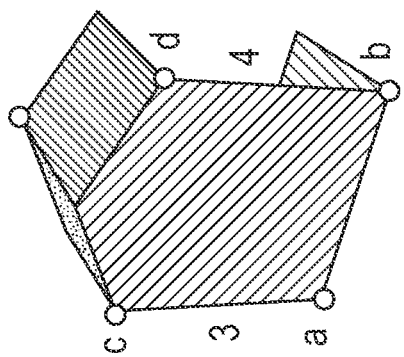
Figure 21:
Figure 21:
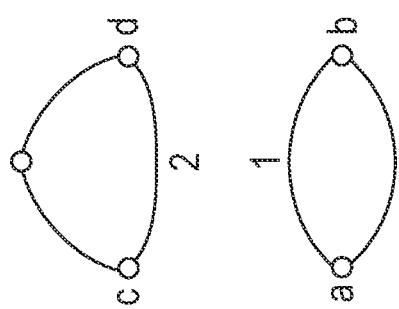
Figure 21:
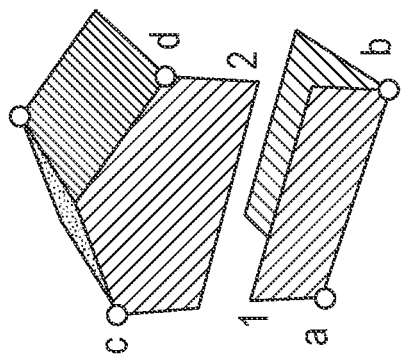

The splice operation A|B| can be generalized for the 3D case. In the 3D case, the splice operation is a graph operation where the connections between two edges are swapped. FIG. 21 provides an example of this splice operation in that it merges two separate graphs into one. The two graphs are joined along a common face. Faces are edges in the boundary. Edge 1 goes from vertex a to b. Edge 2 from c to d. The splice operation replaces these edges. Edge 3 goes from a to c. Edge 4 from b to d. This is the same splice operation referenced above in the 2D case but it requires a shift in perspective thinking of the boundary ∂G as a graph rather than a string.

Additional Example

Figure 22A:
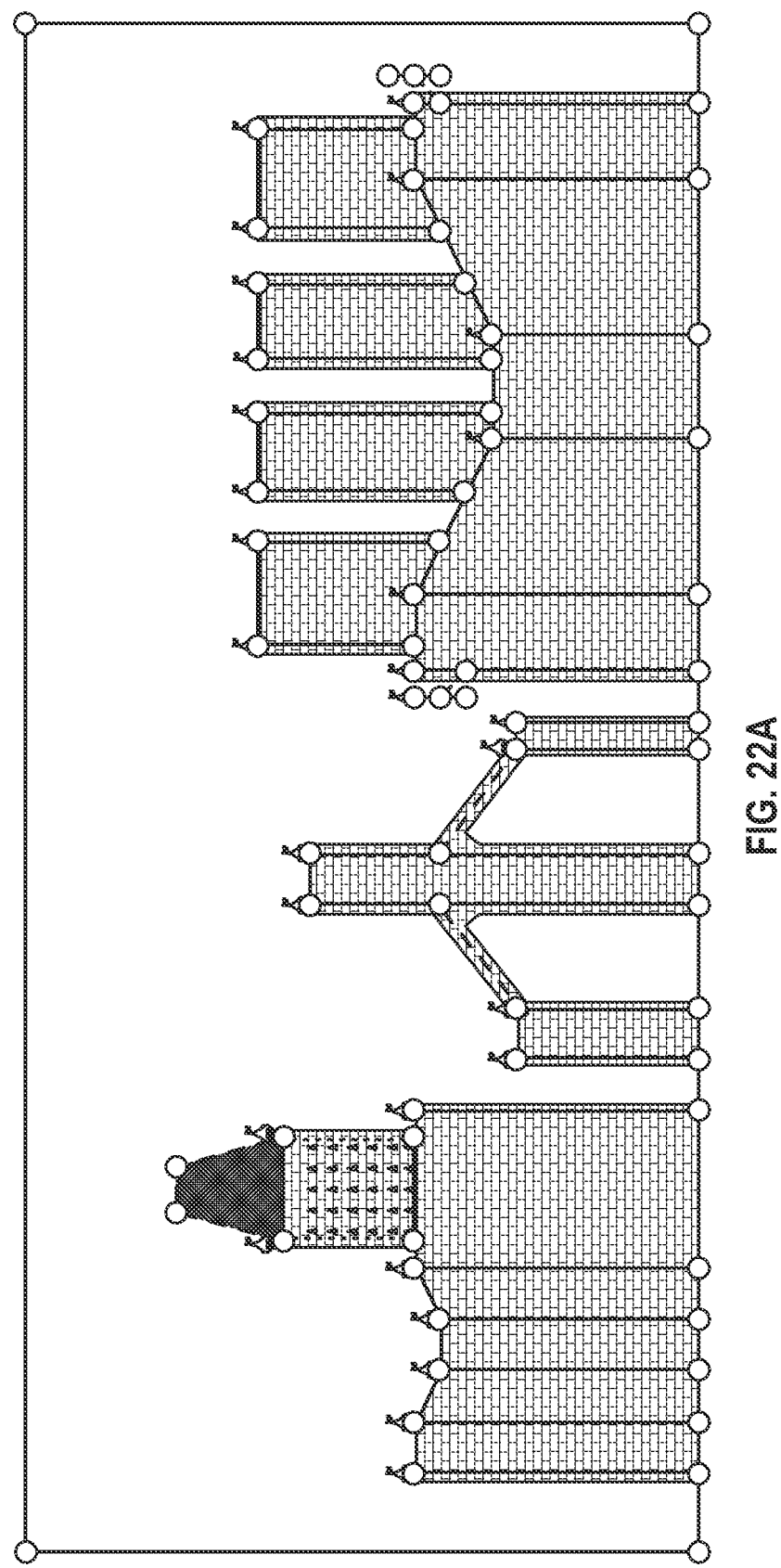
FIGS. 22A and 22B provide an example of an input shape and a graph grammar that can be automatically generated from this input shape in accordance with one or more embodiments of the present invention.
Figure 22B:
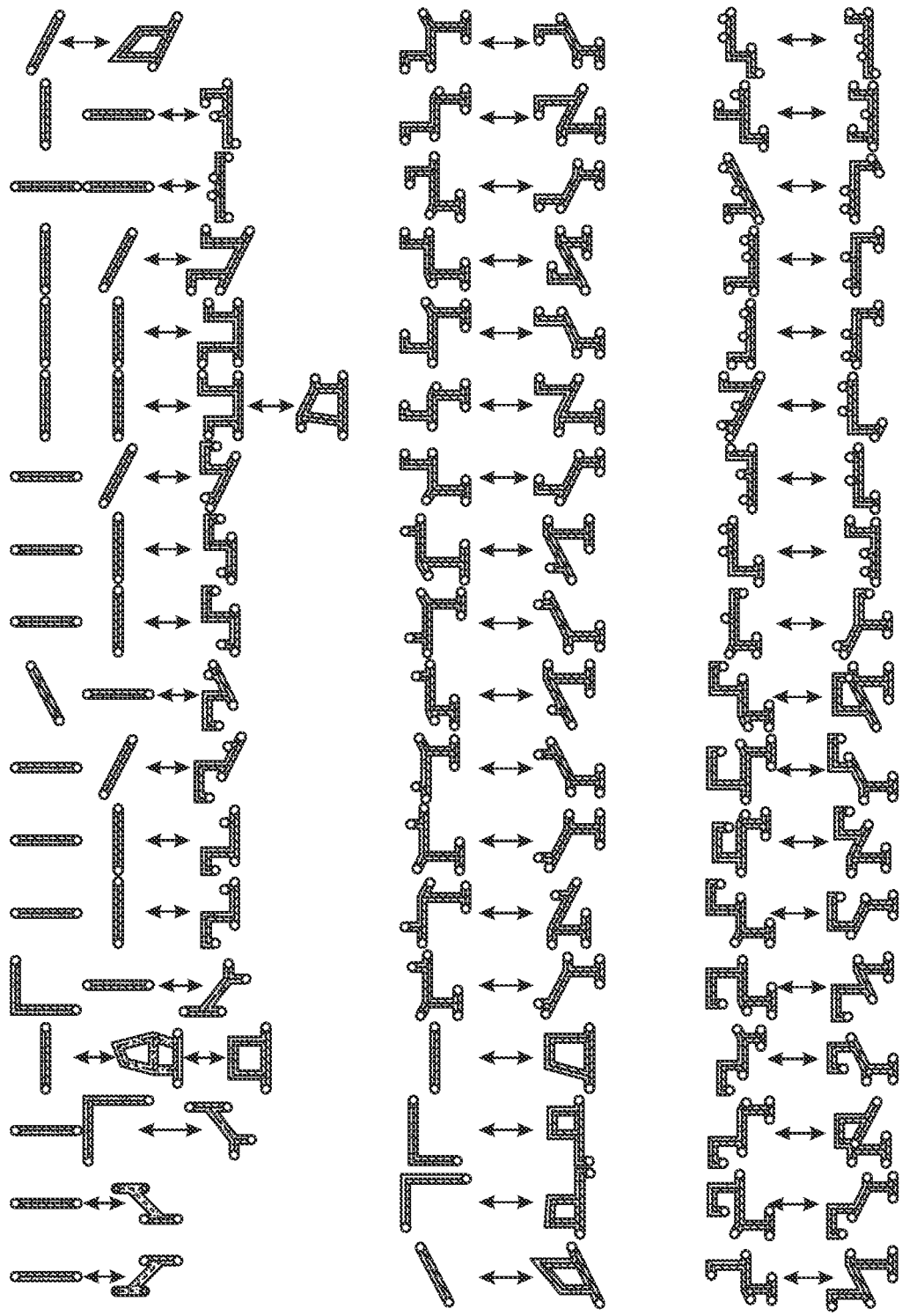
Figure 22B:
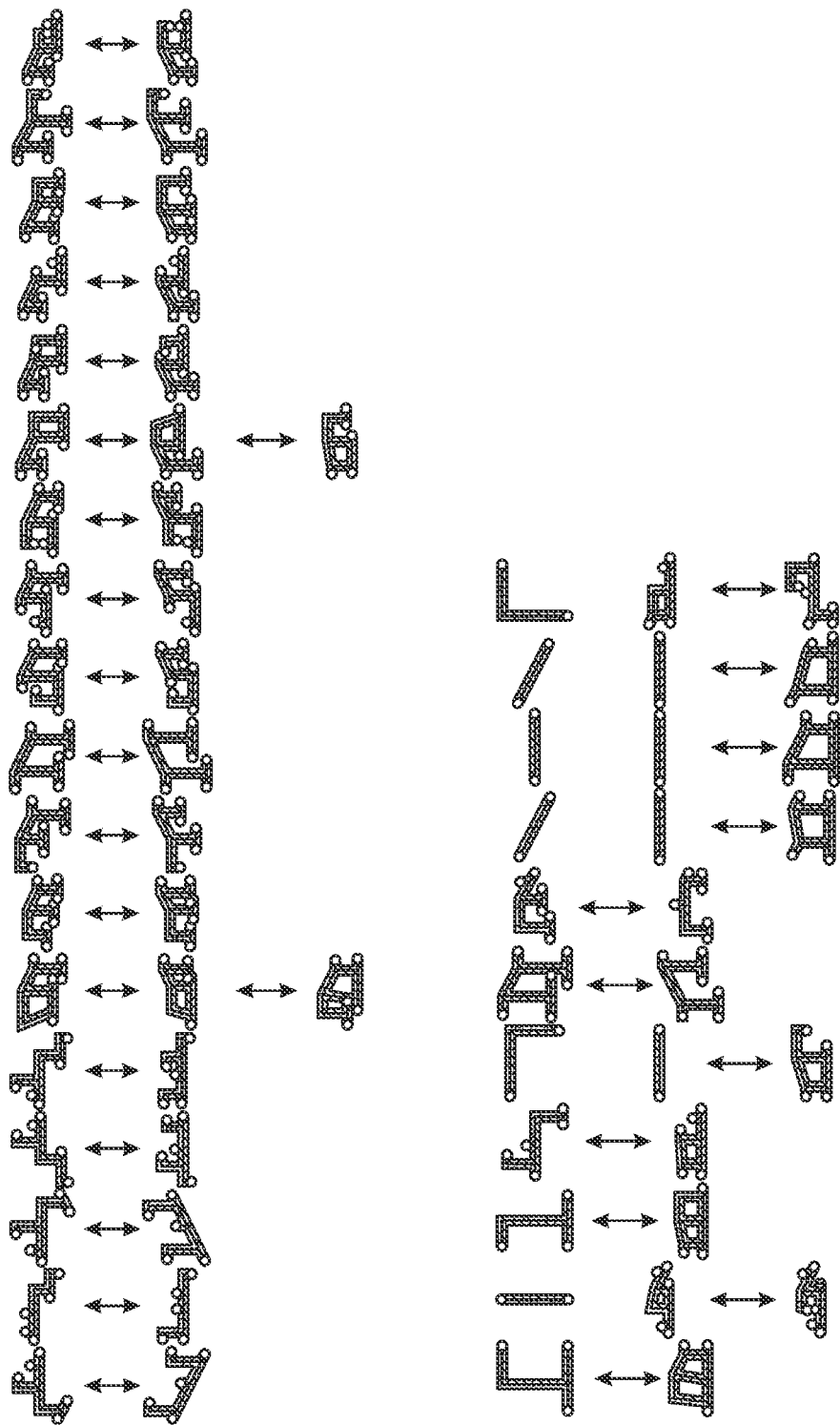

FIG. 22A provides an example of an input shape, which is a castle, and FIG. 22B shows a graph grammar consisting of 88 DPO rules that can be automatically generated from this input shape using the above-described techniques.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for deriving a graph grammar consisting of production rules, the method comprising:
    identifying an example shape;
    splitting the example shape into primitives, each primitive encompassing a vertex of the example shape;
    creating a graph hierarchy of graphs, the graphs including:
        the primitives,
        graphs that are formed by attaching the primitives together, and
        graphs that are formed by attaching the primitives to other non-primitive graphs;
    for each of one or more graphs in the graph hierarchy, finding a matching set of graphs in the graph hierarchy; and
    for each matching set of graphs in the graph hierarchy, defining a production rule of the graph grammar based on the matching set.

2. The method of claim 1, wherein the graphs also include edges, and wherein the edges form a top level of the graph hierarchy.

3. The method of claim 2, wherein the primitives form a second level of the graph hierarchy.

4. The method of claim 3, wherein the graphs that are formed by attaching the primitives together form a third level of the graph hierarchy.

5. The method of claim 4, wherein the graphs that are formed by attaching the primitives to other non-primitive graphs form a fourth level of the graph hierarchy.

6. The method of claim 1, wherein a matching set of graphs have the same boundary strings.

7. The method of claim 6, wherein a matching set of graphs have the same half-edges.

8. The method of claim 7, wherein a matching set of graphs have the same turns.

9. The method of claim 8, wherein, a matching set of graphs have half-edges that are partitioned and the partition does not cross.

10. The method of claim 1, wherein finding a matching set of graphs in the graph hierarchy for a first graph comprises identifying each way in which other graphs in the graph hierarchy can be matched to half-edges of the first graph.

11. The method of claim 10, wherein finding the matching set of graphs in the graph hierarchy for the first graph comprises, for each way in which other graphs in the graph hierarchy can be matched to half-edges of the first graph, grouping any unmatched half-edges of the first graph into groups of consecutive half-edges.

12. The method of claim 11, wherein finding the matching set of graphs in the graph hierarchy for the first graph comprises, for each grouping, finding a matching set of graphs in the graph hierarchy for the unmatched half-edges represented by the grouping.

13. The method of claim 1, wherein finding a matching set of graphs in the graph hierarchy comprises matching faces and edges of a 3D mesh.

14. A method for deriving a graph grammar consisting of production rules and then using the graph grammar to construct shapes, the method comprising:
   identifying an example shape;
   splitting the example shape into primitives, each primitive encompassing a vertex of the example shape;
   creating a graph hierarchy of graphs, the graphs including:
      the primitives,
      graphs that are formed by attaching the primitives together, and
      graphs that are formed by attaching the primitives to other non-primitive graphs;
   for each of one or more graphs in the graph hierarchy, finding a matching set of graphs in the graph hierarchy;
   for each matching set of graphs in the graph hierarchy, defining a production rule of the graph grammar based on the matching set; and
   constructing shapes using the graph grammar.

15. The method of claim 14, wherein constructing shapes using the graph grammar comprises generating angle graphs without vertex positions.

16. One or more computer storage media storing computer executable instructions which when executed implement a method for deriving a graph grammar consisting of production rules, the method comprising:
   identifying an example shape;
   splitting the example shape into primitives, each primitive encompassing a vertex of the example shape;
   creating a graph hierarchy of graphs, the graphs including:
      the primitives,
      graphs that are formed by attaching the primitives together, and
      graphs that are formed by attaching the primitives to other non-primitive graphs;
   for each of one or more graphs in the graph hierarchy, finding a matching set of graphs in the graph hierarchy; and
   for each matching set of graphs in the graph hierarchy, defining a production rule of the graph grammar based on the matching set.

17. The computer storage media of claim 16, wherein the example shape is two-dimensional and wherein a matching set of graphs have the same boundary strings.

18. The computer storage media of claim 16, wherein the example shape is three-dimensional and wherein a matching set of graphs have the same boundary surface.

19. The computer storage media of claim 16, wherein the method further comprises:
   reducing a particular graph in the graph hierarchy using descendants of the particular graph.

20. The computer storage media of claim 16, wherein the method further comprises:
   reducing a particular graph in the graph hierarchy using a stub.

* * * * *